United States Patent
Van der Auwera et al.

(10) Patent No.: US 12,114,000 B2
(45) Date of Patent: Oct. 8, 2024

(54) COMBINED RESIDUAL CODING IN VIDEO CODING

(71) Applicant: QUALCOMM Incorporated, San Diego, CA (US)

(72) Inventors: Geert Van der Auwera, Del Mar, CA (US); Bappaditya Ray, La Jolla, CA (US); Adarsh Krishnan Ramasubramonian, Irvine, CA (US); Muhammed Zeyd Coban, Carlsbad, CA (US); Luong Pham Van, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 560 days.

(21) Appl. No.: 16/810,680

(22) Filed: Mar. 5, 2020

(65) Prior Publication Data
US 2020/0288159 A1  Sep. 10, 2020

Related U.S. Application Data

(60) Provisional application No. 62/866,450, filed on Jun. 25, 2019, provisional application No. 62/815,936, filed on Mar. 8, 2019.

(51) Int. Cl.
*H04N 19/44*  (2014.01)
*H04N 19/159*  (2014.01)
(Continued)

(52) U.S. Cl.
CPC .......... *H04N 19/45* (2014.11); *H04N 19/159* (2014.11); *H04N 19/176* (2014.11); *H04N 19/186* (2014.11); *H04N 19/174* (2014.11)

(58) Field of Classification Search
None
See application file for complete search history.

(56) References Cited

U.S. PATENT DOCUMENTS 9,807,401 B2    10/2017  Wang et al.
2009/0116554 A1*  5/2009  Ma .................... H04N 19/523
                                         375/240.16
(Continued)

FOREIGN PATENT DOCUMENTS

WO    2013067174 A1    5/2013
WO    2015066525 A1    5/2015
(Continued)

OTHER PUBLICATIONS

Auwera G., et al., "CE7-related: Joint Coding of Chroma Residuals", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0347-v3, pp. 1-12.
(Continued)

*Primary Examiner* — Mohammed Jebari
(74) *Attorney, Agent, or Firm* — Shumaker & Sieffert, P.A.

(57) ABSTRACT

A video decoder may apply a first inverse residual modification function to first decoded modified chroma residual data to generate first inverse modified chroma residual data. Additionally, the video decoder may apply a second inverse residual modification function to second decoded modified chroma residual data to generate second inverse modified chroma residual data. The first decoded modified chroma residual data is associated with a first chroma component and the second decoded modified chroma residual data is associated with a second chroma component. The video decoder may reconstruct a block of video data based on the
(Continued)

first inverse modified chroma residual data and the second inverse modified chroma residual data.

16 Claims, 10 Drawing Sheets

(51) Int. Cl.
    *H04N 19/174*    (2014.01)
    *H04N 19/176*    (2014.01)
    *H04N 19/186*    (2014.01)

(56) References Cited

U.S. PATENT DOCUMENTS

| | | | | |
|---|---|---|---|---|
| 2014/0064379 | A1* | 3/2014 | Mrak | H04N 19/85 375/240.18 |
| 2015/0124865 | A1 | 5/2015 | Kim et al. | |
| 2015/0373349 | A1* | 12/2015 | Zhang | H04N 19/463 375/240.02 |
| 2016/0219283 | A1 | 7/2016 | Chen et al. | |
| 2016/0227224 | A1* | 8/2016 | Hsieh | H04N 19/61 |
| 2016/0277762 | A1 | 9/2016 | Zhang et al. | |
| 2017/0127085 | A1 | 5/2017 | Sun et al. | |
| 2018/0077426 | A1 | 3/2018 | Zhang et al. | |
| 2018/0176594 | A1 | 6/2018 | Zhang et al. | |
| 2018/0270481 | A1 | 9/2018 | Rosewarne | |
| 2019/0007688 | A1 | 1/2019 | Zhang et al. | |
| 2019/0052878 | A1 | 2/2019 | Zhao et al. | |
| 2019/0124367 | A1* | 4/2019 | Lu | H04N 19/46 |
| 2020/0267392 | A1* | 8/2020 | Lu | H04N 19/182 |
| 2020/0288173 | A1* | 9/2020 | Ye | H04N 19/186 |
| 2021/0211738 | A1* | 7/2021 | Yin | H04N 19/147 |

FOREIGN PATENT DOCUMENTS

| | | | |
|---|---|---|---|
| WO | 2018184807 | A1 | 10/2018 |
| WO | 2019076138 | A1 | 4/2019 |
| WO | 2019160986 | A1 | 8/2019 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.
Bross B., et al., "Versatile Video Coding (Draft 23)", JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.
Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.
Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.
Chen J., et al., "Algorithm Description for Versatile Video Coding and Test Model 3 (VTM 3)", 12, JVET Meeting, Oct. 3, 2018-Oct. 12, 2018, Macao, (The Joint Video Exploration Team of ISO/IEC JTC1/SC29/WG11 and ITU-T SG.16, JVET-L1002, Dec. 3, 2018 (Dec. 3, 2018), XP030198628, 38 pages, Retrieved from the Internet: URL: http://phenix.int-evry.fr/jvet/doc_end_user/documents/12_Macao/wg11/JVET-L1002-v1.zip JVET-L1002-v1.docx [retrieved on Dec. 3, 2018], paragraph [3.2.5], paragraph [3.9.1].
Chen J., et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-v1, Jan. 9-18, 2019, 61 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ , No. JVET-A1001 Feb. 24, 2016 (Feb. 24, 2016), XP030150000, 27 pages.
Chen J., et al., "CE6.a.4: Chroma intra prediction by reconstructed luma samples", JCTVC-E266-r1, JCTVC meeting, Geneva, Switzerland, Mar. 16-23, 2011, 10 pages.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Ford A., et al., "Colour Space Conversions", University of Westminster, London, Tech. Rep., Aug. 11, 1998, 31 pp.
Helmrich A., et al., "CE7-Related: Joint Chroma Residual Coding with Multiple Modes", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0282-v3, pp. 1-10.
Helmrich C., "CE7: Joint chroma Residual Coding with Multiple Modes (tests CE7-2.1, CE7-2.2)", Joint Video Experts Team (JVET) of ITU-T SG 16 WP 3 and ISO/IEC JTC 1/SC 29/WG 11, JVET-O0105-V2, 15th Meeting: Gothenburg, SE, Jul. 3-12, 2019, pp. 1-9.
Helmrich C., et al., "CE7-related: Alternative Configuration for joint Chroma Residual Coding", JVET-O0543-v1, Joint Video Experts Team (JVET) of ITU-T SG 16 WP 3 and ISO/IEC JTC 1/SC 29/WG 11, Document: JVET-O0543, 15th Meeting: Gothenburg, SE, Jul. 3-12, 2019, pp. 1-8.
Helmrich C., et al., "CE7-related: Alternative Configuration for joint Chroma Residual Coding", JVET-O0543-v2, Joint Video Experts Team (JVET) of ITU-T SG 16 WP 3 and ISO/IEC JTC 1/SC 29/WG 11, Document: JVET-O0543-v2, 15th Meeting: Gothenburg, SE, Jul. 3-12, 2019, pp. 1-8.
"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.
International Search Report and Written Opinion—PCT/US2020/021544—ISA/EPO—dated Jun. 2, 2020.
ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
JVET: "VTM-5.0, Tags, JVET/VVCSoftware_VTM, GitLab", Frank Bossen, https://vcgit.hhi.fraunhofer.de/jvet/VVCSoftware_VTM/-/tags/VTM-5.0, pp. 1-3.
JVET-M0427, CE12-2, Reshaping Delta spec v3, Clean, Based on version 9 of JVET-L1001, 10 Pages.
Lainema A., "CE7: Joint Coding of Chrominance Residuals (CE7-1)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0054, pp. 1-5.
Lainema J., "CE7-related: Joint Coding of Chrominance Residuals", Joint Video Experts Team (JVET) of ITU-T SG 16 WP 3 and ISO/IEC JTC 1/SC 29/WG 11, Document: JVET-M0305, 13th Meeting: Marrakech, MA, Jan. 9-18, 2019, JVET-M0305-v2, pp. 1-5.
Lu T., et al., "CE12: Mapping Functions (test CE12-1 and CE12-2)", Joint Video Experts Team (JVET) of ITU-T SG 16 WP 3 and ISO/IEC JTC 1/SC 29/WG 11, JVET-M0427-V3, 13th Meeting: Marrakech, MA, Jan. 9-18, 2019, Document: JVET-M0427-V2, pp. 1-16.
Ohm J-R., et al., "MPEG-4 Advanced Video Coding", MPEG Doc#: N7314, Jul. 2005, 11 Pages.
Pu, et al., "RCE1: Descriptions and Results for Experiments 1, 2, 3, and 4," JCTVC-O0202_r4, Joint Collaboration Team of Video Coding, ITU-T SG 16 WP 3 and ISO/IEC JTC 1/SC 29/WG 11, Oct. 25-Nov. 1, 2013, Document JCTVC-O0202_V3, 12 Pages.
Ray B., et al., "CE7-2.3: Joint Coding of Chroma Residuals", Joint Video Experts Team (JVET) of ITU-T SG 16 WP 3 and ISO/IEC

(56) References Cited

OTHER PUBLICATIONS

JTC 1/SC 29/WG 11, 15th Meeting: Gothenburg, SE, Jul. 3-12, 2019, Document: JVET-O0115-V1, pp. 1-5.

Ray B., et al., "CE7-related: Alternative joint Coding of Chroma Residuals", JVET-O0670-v2, Joint Video Experts Team (JVET) of ITU-T SG 16 WP 3 and ISO/IEC JTC 1/SC 29/WG 11, Document: JVET-O0670-v2, 15th Meeting: Gothenburg, SE, Jul. 3-12, 2019, pp. 1-5.

Schwarz A., et al., "Description of Core Experiment 7 (CE 7): Quantization and Coefficient Coding", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1027-V4, pp. 1-16.

Schwarz H., et al., "Description of Core Experiment 7 (CE 7): Quantization and coefficient coding", Joint Video Experts Team (JVET) of ITU-T SG 16 WP 3 and ISO/IEC JTC 1/SC 29/WG 11, JVET-M1027-v2, 13th Meeting: Marrakech, MA, Jan. 9-18, 2019, pp. 1-8.

Segall A., et al., "JVET Common Test Conditions and Evaluation Procedures for HDR/WCG Video", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1011, pp. 1-9.

Song B.C., et al., "Block Adaptive Inter-Color Compensation Algorithm for RGB 4:4:4 Video Coding," IEEE Transactions on Circuits and Systems for Video Technology, Oct. 2008, vol. 18, No. 10, pp. 1447-1451.

Xiu X., et al., "Description of SDR, HDR and 360° Video Coding Technology Proposal by InterDigital Communications and Dolby Laboratories", 10. JVET Meeting; Apr. 10, 2018-Apr. 20, 2018; San Diego; (The Joint Video Exploration Team of ISO/IEC JTC1/SC29/WG11 and ITU-TSG.16); URL:http://phenix.int-evry.fr/jvet/, No. JVET-J0015-v1, Apr. 3, 2018 (Apr. 3, 2018), 82 Pages, XP030151174, p. 7-p. 10.

Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017, 51 Pages, p. 20, Paragraph 2.3.7-p. 23, Paragraph 2.3.7.6, p. 17, Paragraph 2.3.5-p. 18, section 2, sections 2.1.1. 2.3.1.Abstract section "2.3.6. affine motion compensation prediction" section "2.3.8. Bi-directional optical flow".

Chen J., et al., "Algorithm Description for Versatile Video Coding and Test Model 4 (VTM 4)", 13th JVET Meeting, Jan. 9, 2019-Jan. 18, 2019, Marrakech, (The Joint Video Exploration Team of ISO/IEC JTC1/SC29/WG11 and ITU-T SG.16 WP3), No. JVET-M1002-v2, Mar. 19, 2019, No. m46628, XP030255391, XP030215567, pp. 1-62, section 2, 3.7, figure 1.

Lainema J., "CE7-Related: Joint Coding of Chrominance Residuals", Joint Video Experts Team (JVET) of ITU-T SG 16 WP 3 and ISO/IEC JTC 1/SC 29/WG 11, 13th Meeting: Marrakech, MA, Jan. 9, 2019-Jan. 18, 2019, JVET-M0305-v3, pp. 1-5.

Lainema J., "CE7-Related: Joint Coding of Chrominance Residuals", Joint Video Experts Team (JVET) of ITU-T SG 16 WP 3 and ISO/IEC JTC 1/SC 29/WG 11, 13th Meeting, Marrakech, MA, Jan. 9-18, 2019, JVET-M0305-V2, 5 Pages.

Taiwan Search Report—TW109107553—TIPO—Aug. 17, 2023.

\* cited by examiner

COMBINED RESIDUAL CODING IN VIDEO CODING

This application claims the benefit of U.S. Provisional Patent Application 62/815,936, filed Mar. 8, 2019, and U.S. Provisional Patent Application 62/866,450, filed Jun. 25, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for combined residual coding in video coding. As described herein, a video encoder and a video decoder may perform combined residual coding to encode and decode blocks of video data. To perform combined residual coding, the video encoder may apply a first residual modification function to Cb residual data of a block and a second residual modification function to Cr residual data of the block. The first residual modification function modifies the Cb residual data of the block based on both the original Cb residual data of the block and the Cr residual data of the block. Similarly, the second residual modification function modifies the Cr residual data of the block based on both the original Cr residual data of the block and the Cb residual data of the block. The video decoder applies inverse residual modification functions to decoded Cb and Cr residual data of the block. By applying the residual modification functions, the video encoder may be able to represent the Cb and Cr chroma residual data using lower values. Lower values typically may be encoded using fewer bits. Accordingly, application of the residual modification functions may result in greater coding efficiency (e.g., greater compression).

In one example, this disclosure describes a method of decoding video data, the method comprising: generating first decoded modified chroma residual data by applying an inverse transform to convert a first set of transform coefficients of a block of the video data from a transform domain to a sample domain; generating second decoded modified chroma residual data by applying the inverse transform to convert a second set of transform coefficients of the block from the transform domain to the sample domain; after generating the first decoded modified chroma residual data, applying a first inverse residual modification function to the first decoded modified chroma residual data to generate first inverse modified chroma residual data; after generating the second decoded modified chroma residual data, applying a second inverse residual modification function to the second decoded modified chroma residual data to generate second inverse modified chroma residual data, wherein the first decoded modified chroma residual data is associated with a first chroma component and the second decoded modified chroma residual data is associated with a second chroma component; and reconstructing the block of the video data based on the first inverse modified chroma residual data and the second inverse modified chroma residual data.

In another example, this disclosure describes a method of encoding video data, the method comprising: applying a first residual modification function to first chroma residual data of a block of the video data to generate first modified chroma residual data; encoding the first modified chroma residual data, wherein encoding the first modified chroma residual data comprises, after applying the first residual modification function to the first chroma residual data, applying a forward transform to the first modified chroma residual data to convert the first modified chroma residual data from a sample domain to a transform domain; applying a second residual modification function to second chroma residual data of the block to generate second modified chroma residual data; and encoding the second modified chroma residual data, wherein: the first chroma residual data is associated with a first chroma component and the second chroma residual data is associated with a second chroma component, and encoding the second modified chroma residual data comprises, after applying the second residual modification function to the second chroma residual data, applying the forward transform to the second modified chroma residual data to convert the second modified chroma residual data from the sample domain to the transform domain.

In another example, this disclosure describes a device for decoding video data, the device comprising: a memory to store the video data; and one or more processors implemented in circuitry, the one or more processors configured to: generate first decoded modified chroma residual data by applying an inverse transform to convert a first set of transform coefficients of a block of the video data from a transform domain to a sample domain; generate second decoded modified chroma residual data by applying the inverse transform to convert a second set of transform coefficients of the block from the transform domain to the sample domain; after generating the first decoded modified chroma residual data, apply a first inverse residual modification function to the first decoded modified chroma residual data to generate first inverse modified chroma residual data; after generating the second decoded modified chroma residual data, apply a second inverse residual modification function to the second decoded modified chroma residual data to generate second inverse modified chroma residual data, wherein the first decoded modified chroma residual data is associated with a first chroma component and the second decoded modified chroma residual data is associated with a second chroma component; and reconstruct the block of the video data based on the first inverse modified chroma residual data and the second inverse modified chroma residual data.

In another example, this disclosure describes a device for encoding video data, the device comprising: a memory to store the video data; and one or more processors implemented in circuitry, the one or more processors configured to: apply a first residual modification function to first chroma residual data of a block of the video data to generate first modified chroma residual data; encode the first modified chroma residual data, wherein the one or more processors are configured such that, as part of encoding the first modified chroma residual data, the one or more processors, after applying the first residual modification function to the first chroma residual data, apply a forward transform to the first modified chroma residual data to convert the first modified chroma residual data from a sample domain to a transform domain; apply a second residual modification function to second chroma residual data of the block to generate second modified chroma residual data; and encode the second modified chroma residual data, wherein: the first chroma residual data is associated with a first chroma component and the second chroma residual data is associated with a second chroma component, and the one or more processors are configured such that, as part of encoding the second modified chroma residual data, the one or more processors, after applying the second residual modification function to the second chroma residual data, apply the forward transform to the second modified chroma residual data to convert the second modified chroma residual data from the sample domain to the transform domain.

In another example, this disclosure describes a device for decoding video data, the device comprising: means for generating first decoded modified chroma residual data by applying an inverse transform to convert a first set of transform coefficients of a block of the video data from a transform domain to a sample domain; means for generating second decoded modified chroma residual data by applying the inverse transform to convert a second set of transform coefficients of the block from the transform domain to the sample domain; means for applying, after generating the first decoded modified chroma residual data, a first inverse residual modification function to the first decoded modified chroma residual data to generate first inverse modified chroma residual data; means for applying, after generating the second decoded modified chroma residual data, a second inverse residual modification function to the second decoded modified chroma residual data to generate second inverse modified chroma residual data, wherein the first decoded modified chroma residual data is associated with a first chroma component and the second decoded modified chroma residual data is associated with a second chroma component; and means for reconstructing the block of the video data based on the first inverse modified chroma residual data and the second inverse modified chroma residual data.

In another example, this disclosure describes a device for encoding video data, the device comprising: means for applying a first residual modification function to first chroma residual data of a block of the video data to generate first modified chroma residual data; means for encoding the first modified chroma residual data, wherein encoding the first modified chroma residual data comprises means for applying, after applying the first residual modification function to the first chroma residual data, a forward transform to the first modified chroma residual data to convert the first modified chroma residual data from a sample domain to a transform domain; means for applying a second residual modification function to second chroma residual data of the block to generate second modified chroma residual data; and means for encoding the second modified chroma residual data, wherein: the first chroma residual data is associated with a first chroma component and the second chroma residual data is associated with a second chroma component, and the means for encoding the second modified chroma residual data comprises means for applying, after applying the second residual modification function to the second chroma residual data, the forward transform to the second modified chroma residual data to convert the second modified chroma residual data from the sample domain to the transform domain.

In another example, this disclosure describes a computer-readable storage medium having stored thereon instructions that, when executed, cause one or more processors to: generate first decoded modified chroma residual data by applying an inverse transform to convert a first set of transform coefficients of a block of video data from a transform domain to a sample domain; generate second decoded modified chroma residual data by applying the inverse transform to convert a second set of transform coefficients of the block from the transform domain to the sample domain; after generating the first decoded modified chroma residual data, apply a first inverse residual modification function to the first decoded modified chroma residual data to generate first inverse modified chroma residual data; after generating the second decoded modified chroma residual data, apply a second inverse residual modification function to the second decoded modified chroma residual data to generate second inverse modified chroma residual data, wherein the first decoded modified chroma residual data is associated with a first chroma component and the second decoded modified chroma residual data is associated with a second chroma component; and reconstruct the block of the video data based on the first inverse modified chroma residual data and the second inverse modified chroma residual data.

In another example, this disclosure describes a computer-readable storage medium having stored thereon instructions that, when executed, cause one or more processors to: apply a first residual modification function to first chroma residual data of a block of video data to generate first modified chroma residual data; encode the first modified chroma residual data, wherein as part of causing the one or more processors to encode the first modified chroma residual data, execution of the instructions causes the one or more processors to apply, after applying the first residual modification function to the first chroma residual data, a forward transform to the first modified chroma residual data to convert the first modified chroma residual data from a sample domain to a transform domain; apply a second residual modification function to second chroma residual data of the block to generate second modified chroma residual data; and encode the second modified chroma residual data, wherein: the first chroma residual data is associated with a first chroma component and the second chroma residual data is associated with a second chroma component, and as part of causing the one or more processors encode the second modified chroma residual data, execution of the instructions causes the one or more processors to apply, after applying the second residual modification function to the second chroma residual data, the forward transform to the second modified chroma residual data to convert the second modified chroma residual data from the sample domain to the transform domain.

The details of one or more examples are set forth in the accompanying drawings and the description below. Other features, objects, and advantages will be apparent from the description, drawings, and claims.

DETAILED DESCRIPTION

Figure 1:
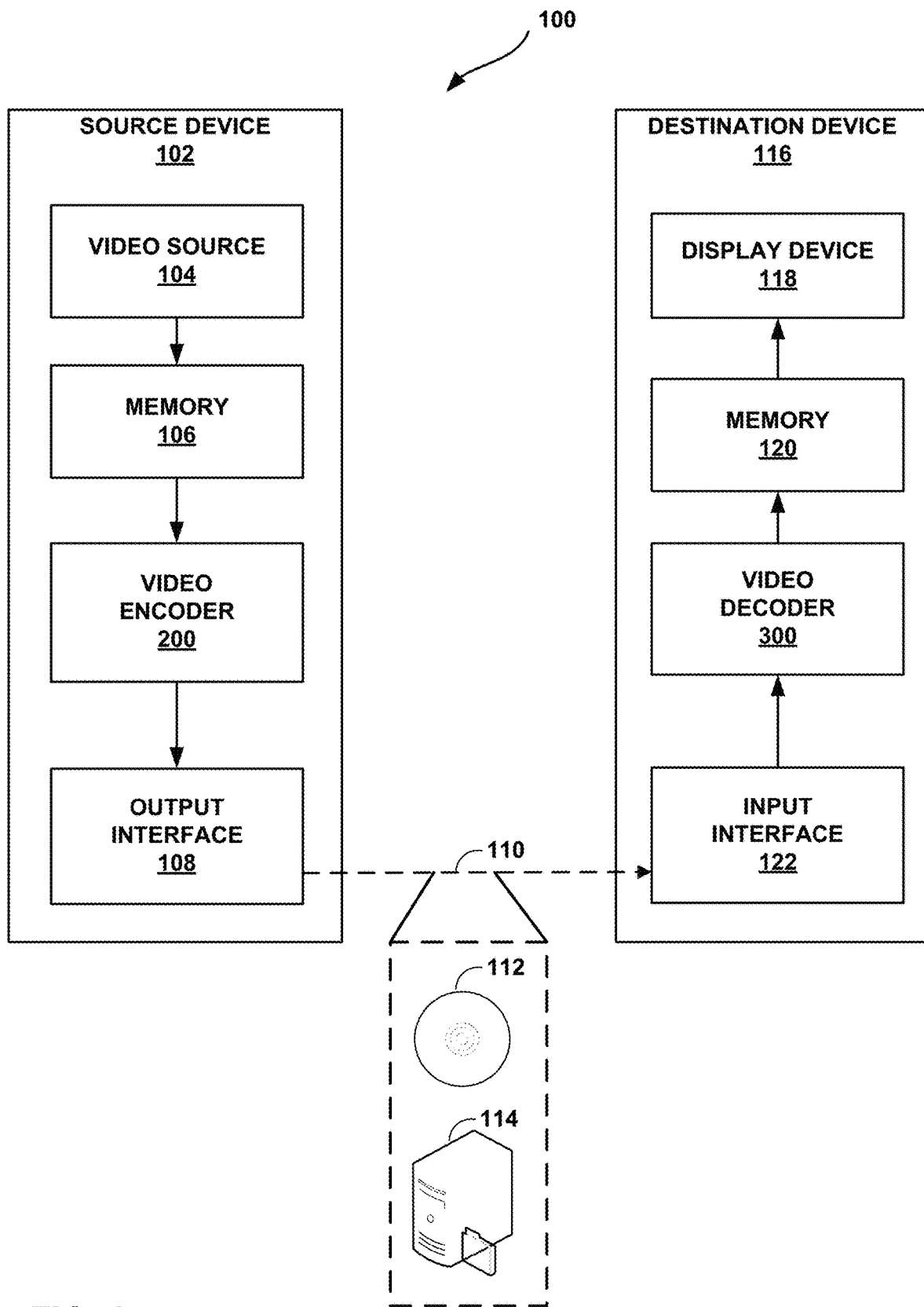
FIG. 1 is a block diagram illustrating an example video encoding and decoding system that may perform the techniques of this disclosure.

Video data is often represented in the YCbCr color space. That is, each pixel of a picture may be represented by a luma, Y, component and two chroma components, Cb and Cr. Representing video data in the YCbCr color space may reduce redundancy inherent in the Red Green Blue (RGB) color space. However, significant correlation may remain between Cb and Cr values. Reducing this correlation may enable better coding efficiency.

This disclosure describes techniques that may reduce cross-component correlation, which may improve coding efficiency. As described herein, a video encoder may apply residual modification functions (RMFs) to residual chroma data. A video decoder may apply inverse RMFs to decoded residual chroma data. The inverse RMFs may at least partially reverse the effects of the RMFs applied by the video encoder. As described herein, the RMF applied to the residual chroma data for chroma component may use the residual chroma data for the chroma component and the other chroma component. Thus, two sets of modified chroma residual data are still encoded for different chroma components of a single block, but the video encoder modifies the chroma residual data for the chroma components in view of each other. Applying such RMFs may improve coding efficiency. For example, applying such RMFs may reduce the number of bits required to encode the video data because application of such RMFs may reduce the values of the chroma residual data.

In one example, a video encoder may apply a first residual modification function to first chroma residual data of a block of the video data to generate first modified chroma residual data. The video encoder may also encode the first modified chroma residual data. As part of encoding the first modified chroma residual data, the video encoder may, after applying the first residual modification function to the first chroma residual data, apply a forward transform to the first modified chroma residual data to convert the first modified chroma residual data from a sample domain to a transform domain. Additionally, the video encoder may apply a second residual modification function to second chroma residual data of the block to generate second modified chroma residual data. The video encoder may also encode the second modified chroma residual data. The first chroma residual data is associated with a first chroma component and the second chroma residual data is associated with a second chroma component. As part of encoding the second modified chroma residual data, the video encoder may, after applying the second residual modification function to the second chroma residual data, apply the forward transform to the second modified chroma residual data to convert the second modified chroma residual data from the sample domain to the transform domain.

Similarly, a video decoder may generate first decoded modified chroma residual data by applying an inverse transform to convert a first set of transform coefficients of a block of the video data from a transform domain to a sample domain. Additionally, the video decoder may generate second decoded modified chroma residual data by applying the inverse transform to convert a second set of transform coefficients of the block from the transform domain to the sample domain. After generating the first decoded modified chroma residual data, the video decoder may apply a first inverse residual modification function to first decoded modified chroma residual data to generate first inverse modified chroma residual data. After generating the second decoded modified chroma residual data, the video decoder may apply a second inverse residual modification function to second decoded modified chroma residual data to generate second inverse modified chroma residual data. The first decoded modified chroma residual data is associated with a first chroma component and the second decoded modified chroma residual data is associated with a second chroma component. The video decoder may reconstruct a block of the video data based on the first inverse modified chroma residual data and the second inverse modified chroma residual data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques of this disclosure for combined residual coding (CRC). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques of this disclosure for combined residual coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (WET) of ITU-T SG 16 WP 3 and ISO/IEC JTC 1/SC 29/WG 11, 13th Meeting: Marrakech, MA, 9-18 Jan. 2019, JVET-M1001-v5 (hereinafter "VVC Draft 4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode syntax elements representing transform coefficients in the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, video encoder 200 and video decoder 300 may apply CABAC encoding and decoding to values of syntax elements. To apply CABAC encoding to a syntax element, video encoder 200 may binarize the value of the syntax element to form a series of one or more bits, which are referred to as "bins." In addition, video encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 200 may repeat these steps with the interval being the sub-interval associated with the value of the encoded bit. When video encoder 200 repeats these steps for the next bin, video encoder 200 may use modified probabilities based on the probabilities indicated by the identified coding context and the actual values of bins encoded.

When video decoder 300 performs CABAC decoding on a value of a syntax element, video decoder 300 may identify a coding context. Video decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 300 may decode a bin having the value associated with the lower sub-interval. If the encoded value is within the upper sub-interval, video decoder 300 may decode a bin having the value associated with the upper sub-interval. To decode a next bin of the syntax element, video decoder 300 may repeat these steps with the interval being the sub-interval that contains the encoded value. When video decoder 300 repeats these steps for the next bin, video decoder 300 may use modified probabilities based on the probabilities indicated by the identified coding context and the decoded bins. Video decoder 300 may then de-binarize the bins to recover the value of the syntax element.

In some instances, video encoder 200 may encode bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 200 and video decoder 300. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Furthermore, as noted above, a bitstream may include a representation of encoded pictures of the video data and associated data. The associated data may include parameter sets. Network Abstraction Layer (NAL) units may encapsulate Raw Byte Sequence Payloads (RBSPs) for video parameter sets (VPSs), sequence parameter sets (SPSs), and picture parameter sets (PPSs). A VPS is a syntax structure that includes syntax elements that apply to zero or more entire coded video sequences (CVSs). An SPS is also a syntax structure that includes syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure that includes syntax elements that apply to zero or more coded pictures. A PPS may include a syntax element that identifies an SPS that is active when the PPS is active. A slice header of a slice may include a syntax element that indicates a PPS that is active when the slice is being coded.

Color video plays an essential role in multimedia systems, where various color spaces are used to efficiently represent color. A color space specifies color with numerical values using multiple components. A popular color space is the RGB color space, where color is represented as a combination of three primary color component values: red, green and blue.

For color video compression, the YCbCr color space has been widely used. See A. Ford and A. Roberts, "Colour space conversions," University of Westminster, London, Tech. Rep., August 1998. YCbCr can be converted from RGB color space via a linear transformation and the redundancy between different components, namely the cross-component redundancy, is significantly reduced in the YCbCr color space. One advantage of YCbCr is the backward compatibility with black and white TV as the Y signal conveys the luminance (luma) information. In addition, the chrominance (chroma) bandwidth can be reduced by sub-sampling the Cb and Cr components in 4:2:0 chroma sampling format with significantly less subjective impact than subsampling in RGB. Because of these advantages, YCbCr has been the foremost color space in video compression. There are also other color spaces, such as YCoCg, used in video compression. In this document, regardless of the actual color space used, Y, Cb, Cr are used to represent the three color components in the video compression scheme. Although the cross-component redundancy is significantly reduced in YCbCr color space, correlation between the three color components still exists. Various methods have been studied to improve the video coding performance by further reducing the correlation, especially for coding of 4:4:4 chroma format video. As described in B. C. Song, Y. G. Lee, and N. H. Kim, "Block adaptive inter-color compensation algorithm for RGB 4:4:4 video coding," IEEE Trans. Circuits Syst. Video Technol., vol. 18, no. 10, pp. 1447-1451, October 2008, a scale factor and offset are used for each block to predict the chroma signal from the reconstructed luma signal.

In W. Pu, W. S. Kim, J. Chen, J. Sole, M. Karczewicz, "RCE1: Descriptions and Results for Experiments 1, 2, 3, and 4", Joint Collaborative Team on Video Coding (JCT-VC) of ITU-T SG16 WP3 and ISO/IEC JTC1/SC29/WG11, JCTVC-O0202, Geneva, November 2013, Cross-Component Prediction (CCP) is performed in a residual domain. The chroma residual signal is predicted using the reconstructed luma residual signal at the encoder side as:

$$\Delta r_C(x,y) = r_C(x,y) - (\alpha \times r_L'(x,y)) >> 3 \quad (1)$$

and the chroma residual signal is compensated at the decoder side as:

$$r'_C(x,y) = \Delta r'_C(x,y) + (\alpha \times r_L'(x,y)) >> 3 \quad (2)$$

where $r_C(x,y)$ and $r'_C(x,y)$ denote the original and reconstructed chroma residual samples at a position (x,y). $\Delta r_C(x,y)$ and $\Delta r'_C(x,y)$ denote the final chroma residual samples after cross-component prediction. $r'_L(x,y)$ is the reconstructed luma residual sample value. The weighting factor α is explicitly signaled in the bit stream for each chroma transform unit in HEVC. This cross-component residual prediction method was adopted in Format and Range Extension of HEVC standard for 4:4:4 chroma sampling format video coding, performed for both intra predicted residual and inter predicted residual. This cross-component residual prediction method was also proposed for 4:2:0 video format coding, however this cross-component residual prediction method is not adopted because of the limited coding benefit. In addition to using luma to predict the chroma component, it was also proposed that the prediction can be applied between two chroma components, that is, the reconstructed early-coded Cb residual is used to predict the Cr residual. See A. Khairat, T. Nguyen, M. Siekmann, D. Marpe, "Non-RCE1: Extended Adaptive Inter-Component Prediction", Joint Collaborative Team on Video Coding (JCT-VC) of ITU-T SG16 WP3 and ISO/IEC JTC1/SC29/WG11, JCTVC-O0150, Geneva, November 2013. U.S. Patent Publication Nos. 2016/0219283, published Jul. 28, 2016, 2016/0277762, published Sep. 22, 2016, 2018/0077426, published Mar. 15, 2018, 2018/0176594, published Jun. 21, 2018, and 2019/0007688, published Jan. 3, 2019, also describe aspects of cross-component prediction.

In 4:2:0 chroma video coding, a method named Linear Model (LM) prediction mode has been well studied during development of HEVC standard. See J. Chen, V. Seregin, W. J. Han, J. S. Kim, B. M. Joen, "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, Geneva, 16-23 Mar. 2011. In the LM prediction mode, the chroma samples are predicted based on the reconstructed luma samples of the same block by using a linear model as follows:

$$\text{pred}_C(i,j) = \alpha \cdot \text{rec}_L(i,j) + \beta \quad (3)$$

where $\text{pred}_C(i,j)$ represents the prediction of chroma samples in a block and $\text{rec}_L(i,j)$ represents the down-sampled reconstructed luma samples of the same block. Parameters $\alpha$ and $\beta$ are derived by minimizing regression error between the neighboring reconstructed luma and chroma samples around the current block.

$$E(\alpha, \beta) = \sum_i (y_i - (\alpha \cdot x_i + \beta))^2 \qquad (4)$$

The parameters $\alpha$ and $\beta$ are solved as follows:

$$\alpha = \frac{N \sum x_i \cdot y_i - \sum x_i \cdot \sum y_i}{N \sum x_i \cdot x_i - \sum x_i \cdot \sum x_i} \qquad (5)$$

$$\beta = \left(\sum y_i - \alpha \cdot \sum x_i\right) / N \qquad (6)$$

where $x_i$ are down-sampled reconstructed luma reference samples, $y_i$ are reconstructed chroma reference samples, and N is the number of reference samples used.

An in-loop reshaper was adopted at the 13$^{th}$ JVET meeting. See J. Lainema, "CE7-related: Joint coding of chrominance residuals," 13$^{th}$ JVET Meeting, Marrakech, MA, January 2019, JVET-M0305 (hereinafter, "JVET-M0305") and X. Xiu, P. T. Lu, P. Hanhart, R. Vanam, Y. He, Y. Ye, T. Lu, F. Pu, P. Yin, W. Husak, T. Chen, "Description of SDR, HDR, and 360° video coding technology proposal by InterDigital Communications and Dolby Laboratories", JVET-J0015, San Diego, USA, April 2018. The in-loop luma reshaper is implemented as a pair of look-up tables (LUTs), but only one of the two LUTs needs to be signaled (by piecewise linear modelling) as the other one can be computed from the signaled LUT. Each LUT is a one-dimensional, 10-bit, 1024-entry mapping table (1D-LUT) for 10-bit video. One LUT is a forward LUT, Fwd-LUT, that maps input luma code values $Y_i$ (original domain) to altered values $Y_r$: $Y_r$=FwdLUT $[Y_i]$ (reshaped domain). The other LUT is an inverse LUT, InvLUT, that maps altered code values $Y_r$ (reshaped domain) to $\hat{Y}_i$ (original domain) $\hat{Y}_i$=InvLUT$[Y_r]$ ($\hat{Y}_i$ represents the reconstruction values of $Y_i$).

Figure 2:
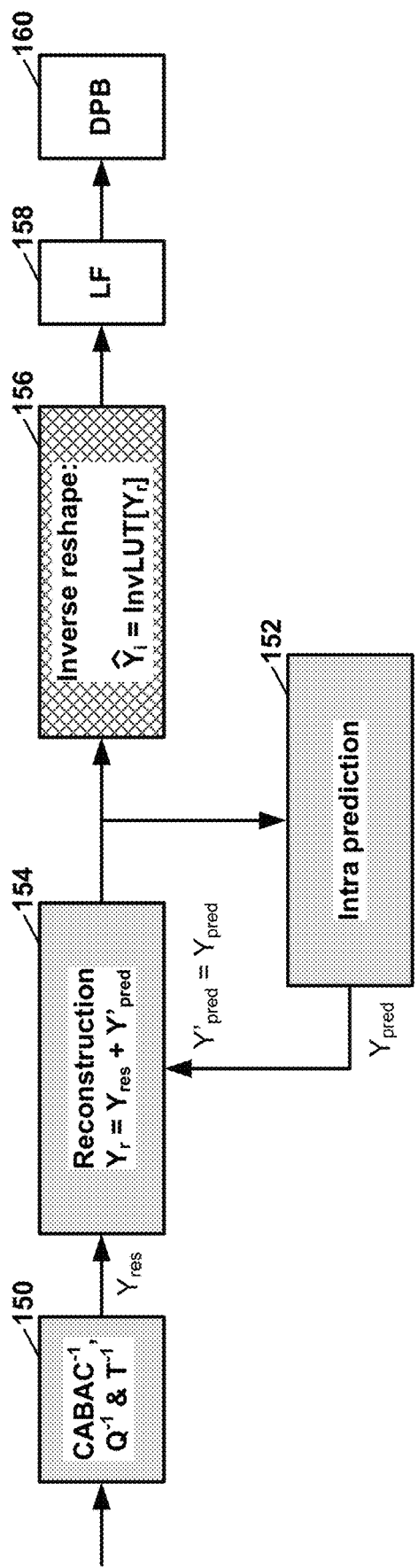
FIG. 2 is a block diagram illustrating an example of intra slice reconstruction with in-loop luma reshaper.

FIG. 2 is a block diagram illustrating an example of intra slice reconstruction with in-loop luma reshaper. For intra slices, only the InvLUT is applied (FIG. 2) at the decoder. In FIG. 2, gray shaded blocks indicate signals in the reshaped domain: luma residue, intra luma predicted, and intra luma reconstructed. More specifically, as shown in the example of FIG. 2, video decoder 300 may perform CABAC decoding (denoted as CABAC$^{-1}$), inverse quantization (denoted as Q$^{-1}$), and inverse transformation (denoted as T$^{-1}$) (150). Additionally, video decoder 300 may perform intra prediction (152) and reconstruction (154) by adding luma residual samples ($Y_{res}$) to intra predicted samples ($Y'_{pred}$). Furthermore, video decoder 300 may perform an inverse reshaping operation (156). Video decoder 300 may apply one or more loop filters (LF) to the output of the inverse reshaping operation (158). The results may be stored in a decoded picture buffer (DPB) (160).

Figure 3:
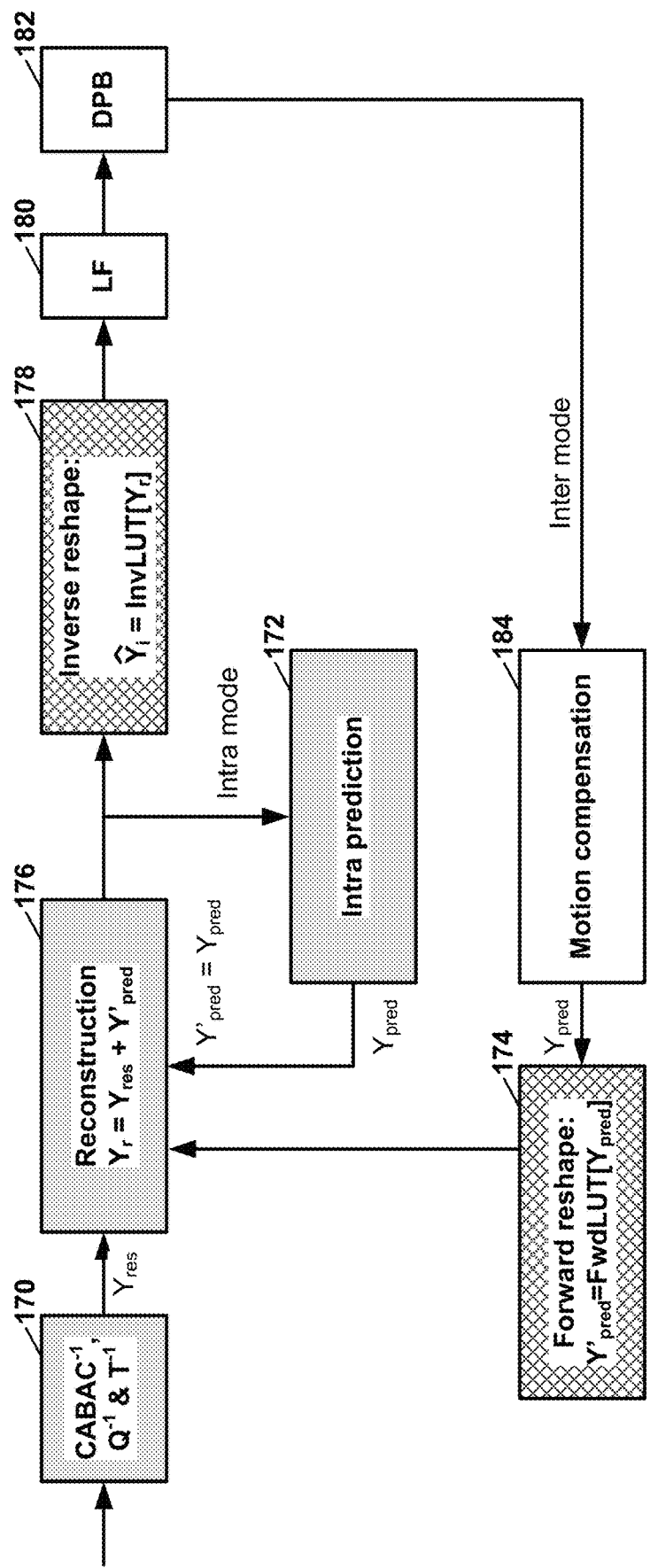
FIG. 3 is a block diagram illustrating an example of inter slice reconstruction with in-loop luma reshaper.

FIG. 3 is a block diagram illustrating an example of inter slice reconstruction with an in-loop luma reshaper. For inter slices (FIG. 3), both FwdLUT and InvLUT are applied. LUTs are applied before loop filtering for both intra and inter slices. In FIG. 3, gray shaded blocks indicate signals in the reshaped domain: luma residue, intra luma predicted, and intra luma reconstructed. Although the term "slice" is used in this document to indicate a collection of coding tree units that are signaled in a NAL unit, it must be understood that the discussion also applies to other spatial partitioning of pictures such as tile groups (used in VVC).

For inter slices (or tile groups) FwdLUT maps motion-compensated values in the original domain to the reshaped domain (FwdLUT[$Y_{pred}$]). InvLUT then maps inter reconstructed values in the reshaped domain to inter reconstructed values in the original domain ($\hat{Y}_i$=InvLUT[$Y_{res}$+FwdLUT $[Y_{pred}]$]). In the example of FIG. 3, intra prediction is always performed in the reshaped domain regardless of the slice type. With such an arrangement, intra prediction can start immediately after the reconstruction of the preceding TU.

In the example of FIG. 3, video decoder 300 may perform CABAC decoding (denoted as CABAC$^{-1}$), inverse quantization (denoted as Q$^{-1}$), and inverse transformation (denoted as T$^{-1}$) (170). Additionally, video decoder 300 may perform intra prediction (172) or a motion compensation (184) and a forward reshape process for the block (174). Video decoder 300 may perform reconstruction (176) by adding luma residual samples ($Y_{res}$) to predicted samples ($Y'_{pred}$). In the example of FIG. 3, if the block is predicted using intra prediction, predicted samples ($Y'_{pred}$) are predicted using intra prediction (172). Video decoder 300 performs intra prediction in the reshaped domain. However, video decoder 300 performs inter prediction in the non-reshaped domain. Hence, if the block is predicted using inter prediction, video decoder 300 performs motion compensation (184) and a forward reshaping operation (174) to convert the predicted samples generated by motion compensation (184) to the reshaped domain.

Furthermore, after reconstruction (176), video decoder 300 may perform an inverse reshaping operation (178). Video decoder 300 may apply one or more loop filters (LF) to the output of the inverse reshaping operation (180). The results may be stored in a decoded picture buffer (DPB) (182). Data from the DPB may be used for motion compensation (184), which may subsequently be used for forward reshaping in a subsequent block (174).

The reshaper model syntax may signal a piece-wise linear (PWL) model with 16 pieces. The 1024-entry mapping tables are constructed by linear interpolation using the 16-piece PWL model. Conceptually, the PWL model may be implemented in the following way. Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In a fixed-point implementation, the equation above can be rewritten as:

$$y=((m*x+2^{FP\_PREC-1})>>FP\_PREC)+c$$

where m is scalar, c is an offset, and FP_PREC is a constant value to specify the precision.

Figure 4:
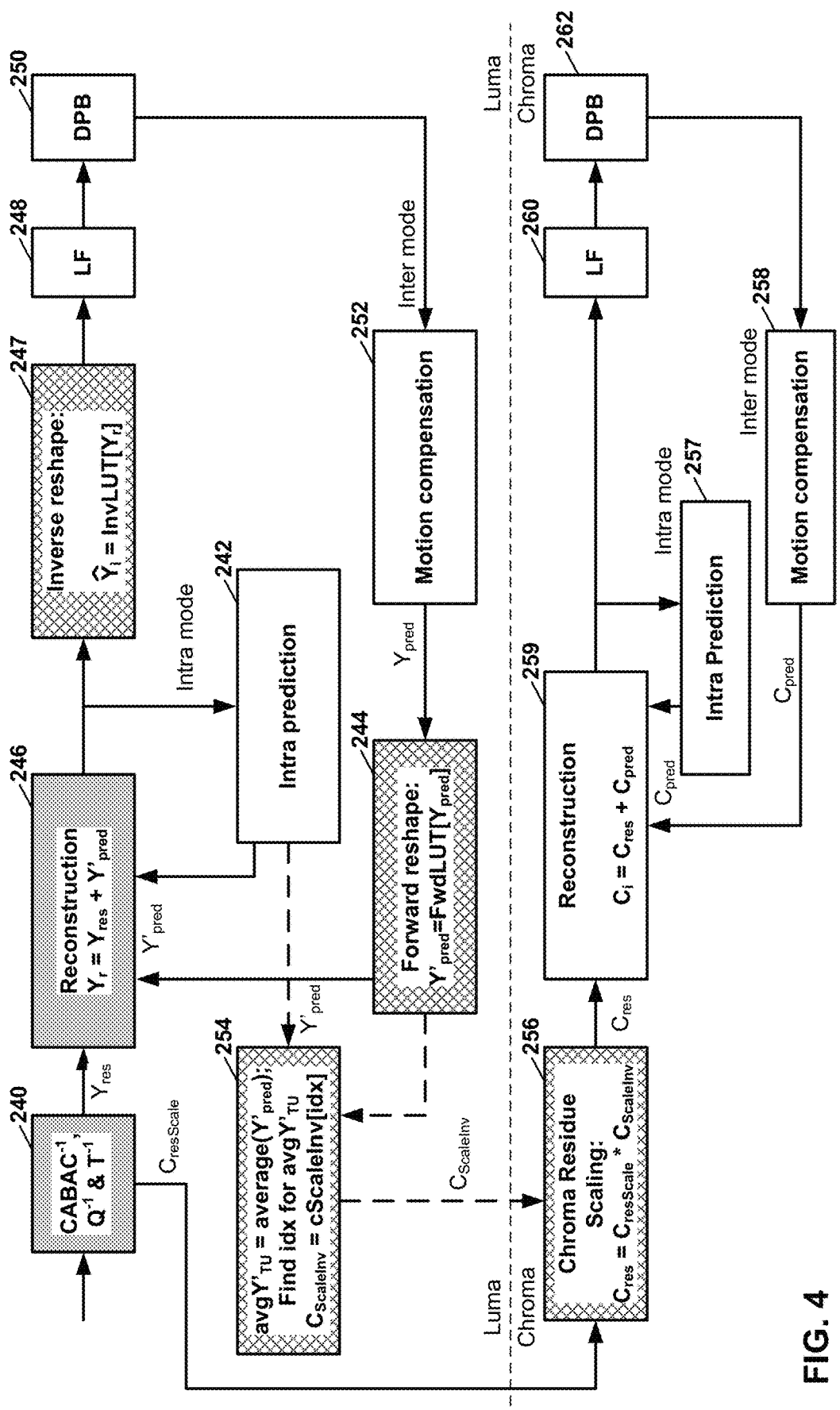
FIG. 4 is a block diagram illustrating an example of intra mode and inter mode reconstruction with chroma residual scaling.

FIG. 4 is a block diagram illustrating an example of intra mode and inter mode reconstruction with chroma residual scaling (CRS). Chroma residue scaling or CRS (FIG. 4) compensates for luma signal interaction with the chroma signal. Chroma residue scaling is applied at the TU level.

Encoder side: $C_{ResScale}=C_{Res}*C_{Scale}=C_{Res}/C_{ScaleInv}$ (7)

Decoder side: $C_{Res}=C_{ResScale}/$
$C_{Scale}=C_{ResScale}*C_{ScaleInv}$ (8)

$C_{Res}$ is the original chroma residual signal and $C_{ResScale}$ is the scaled chroma residual signal. $C_{Scale}$ is a scaling factor calculated using FwdLUT and is converted to its reciprocal $C_{ScaleInv}$ to perform multiplication instead of division at the decoder side, thereby reducing implementation complexity. In FIG. 4, gray shaded blocks indicate signals in the reshaped domain: luma residue, intra luma predicted, and intra luma reconstructed. Under the PWL model, for any input luma value in each luma PWL range, the same chroma scale value is used. Therefore, the luma dependent chroma scales are simplified to be calculated for each luma PWL range instead of each luma code value and are stored in LUT cScaleInv[pieceIdx] (16-piece granularity). The scaling operations at both encoder side and decoder side are implemented with fixed point integer arithmetic with the following equation:

$$c' = \text{sign}(c) * ((\text{abs}(c) * s + 2^{CSCALE\_FP\_PREC-1}) >> CSCALE\_FP\_PREC)$$

where c is the chroma residue, s is the chroma residue scaling factor from cScaleInv[pieceIdx], pieceIdx is decided by the corresponding average luma value of the TU, and CSCALE_FP_PREC is a constant value to specify precision.

The value of $C_{ScaleInv}$ is computed in the following steps:
1. If intra mode is used, compute average of intra predicted luma values; if inter mode is used, compute average of forward reshaped inter predicted luma values. That is, the average luma value avgY'$_{TU}$ is computed in reshaped domain.
2. Find index idx of the luma range in the inverse mapping PWL to which avgY'$_{TU}$ belongs.
3. $C_{ScaleInv}$=cScaleInv[idx]

In the example of FIG. 4, video decoder 300 may perform CABAC decoding (CABAC$^{-1}$), inverse quantization (Q$^{-1}$), and inverse transformation (T$^{-1}$) (240). Outputs of block 240 may include luma residual data (Y$_{res}$) and scaled chroma data (C$_{resScale}$) for a current block of the video data. If the block is encoded using intra mode, video decoder 300 may perform an intra prediction process for the current block (242) to generate luma prediction data (Y'$_{pred}$). Alternatively, if the block is encoded using inter mode, video decoder 300 may perform motion compensation (252) and a forward reshaping process for the current block (244) to generate the luma prediction data (Y'$_{pred}$). Video decoder 300 may perform a luma reconstruction process (246) that reconstructs luma samples based on the luma residual data 1 and prediction data (Y'$_{pred}$). Video decoder 300 may use the reconstructed luma data for intra prediction of subsequent blocks.

Furthermore, in the example of FIG. 4, video decoder 300 may perform an inverse reshaping process (247) on the reconstructed luma data for the current block. Video decoder 300 may apply one or more loop filters (LF) to the output of the inverse reshaping operation (248). Video decoder 300 may store the results in a decoded picture buffer (250). Data in the decoded picture buffer may be used for motion compensation (252) for subsequent blocks of the video data. In the example of FIG. 4, video decoder 300 may also determine an average luma value (avgY'$_{TU}$) for a current transform unit and a chroma residue scaling factor (C$_{scaleInv}$) (254). Video decoder 300 may determine the chroma residue scaling factor as described above.

In the example of FIG. 4, video decoder 300 may perform a chroma residue scaling process (256) that scales the scaled chroma residual data for the current block to produce chroma residual data (C$_{res}$) for the current block. Video decoder 300 may perform the chroma residue scaling process by multiplying samples of the scaled chroma residual data by the chroma residue scaling factor. Additionally, in the example of FIG. 4, video decoder 300 may perform an intra prediction process (257) or a motion compensation process (258) to generate chroma prediction data (C$_{pred}$) for the current block. Video decoder 300 may perform a reconstruction process that reconstructs chroma data of the current block based on the chroma residual data (C$_{res}$) and the chroma prediction data for the current block (259). Video decoder 300 may apply one or more loop filters (LF) to the output of the inverse reshaping operation (260). Video decoder 300 may store the resulting data in the decoded picture buffer (262).

A method for joint coding of Cb-Cr chroma residuals is described in JVET-M0305. In this method, a single joint residual block is used to describe the residuals of both Cb and Cr blocks in the same transform unit. At the encoder side, the algorithm uses the average of the positive Cb residual and negative Cr residual as the input to the transform and quantization process. If the mode is activated, a single residual block is decoded. The residuals of the Cr blocks are generated by negating the decoded joint residual. At the decoder side, when joint residual mode is active, the indicated joint residual is added to the Cb prediction block and deducted from the Cr prediction block. As a single residual is used to represent residuals of two blocks, the chroma quantization parameter (QP) offset parameter is reduced by 2 when the joint chrominance residual mode is active.

The joint residual mode is indicated with a flag in the bitstream if the coded block flags (cbf) for both Cb and Cr are true. Bitstream syntax and decoding process for the joint residual follow those of the Cb residual in VTM-3. See J. Chen, Y. Ye, S. Kim, "Algorithm description for Versatile Video Coding and Test Model 3 (VTM3)," 12$^{th}$ JVET Meeting, Macau SAR, CN, October 2018, JVET-L1002

In core experiment test CE7.1 (H. Schwarz, M. Coban, C. Auyeung, "Description of Core Experiment 7 (CE7): Quantization and coefficient coding," 13th JVET Meeting, Marrakech, MA, January 2019, JVET-M1027), the method is integrated with the in-loop chroma residue scaler (CRS) as follows:
Encoder-side:
  Cb residual: (resCb(x,y)−resCr(x,y))/2→CRS→T→Q (Qp+jointCbCrQpOffset)
  Cr residual: 0
Decoder-side:
  Cb residual: invQ→invT→invCRS→resCb(x,y)'
  Cr residual: −resCb(x,y)'
where CRS is the forward chroma residue scaler, invCRS is the inverse chroma residue scaler, T is the forward transform, Q is the forward quantization, invT is the inverse transform, and invQ is the inverse quantization.

Model based cross-component residual prediction either requires model parameter estimation at the decoder side, which implies an increased implementation cost at video decoder 300, or the model parameters are signaled, which negatively affects coding efficiency and requires decoding the parameters from the bitstream.

The joint Cb-Cr coding method, which combines both chroma residuals into a single residual that is coded into the bitstream, may suffer from chroma artifacts due to the asymmetric processing of both chroma channels. For example, in JVET-M0305, the Cr residual is assumed to be the inverse of the joint residual, which is a coarse approximation. In addition, this method requires tuning of the quantization parameter that is applied to the joint residual after transforms, and tuning of a lambda parameter at the encoder side for rate-distortion optimization in order to properly code the joint residual and achieve coding gain. The quantization parameter offset may be signaled. However, determining precise values may be an additional burden for video encoder 200.

This disclosure describes techniques that may address one or more of the problems described above. The techniques of this disclosure may avoid signaling and decoding of the model parameters of model based cross-component residual prediction and may avoid the tuning of the quantization parameter in the joint Cb-CR coding method described above. Nevertheless, the techniques of this disclosure may reduce correlation between Cb and Cr samples, and thereby may provide coding efficiency gains. The examples provided below and elsewhere in this disclosure may be applied independently, or one or more of the examples may be applicable together.

The following section of this disclosure describes techniques for combined residual coding (CRC). In accordance with the techniques for combined residual coding, the Cb and Cr residual blocks with dimensions (width and height), $resCb(x,y)$ and $resCr(x,y)$, are processed with the residual modification functions (RMFs) $F1(x,y)$ and $F2(x,y)$ to obtain modified residuals that are subsequently forward transformed (T), quantized (Q) and entropy coded (E) at video encoder 200 as is illustrated in Table 1, below.

TABLE 1

- Encoder:
  - $resCb(x,y) = origCb(x,y) - predCb(x,y)$
  - $resCr(x,y) = origCr(x,y) - predCr(x,y)$
  - $resCb(x,y) \rightarrow F1(x,y) \rightarrow T \rightarrow Q(\,Qp + offsetQp1\,) \rightarrow E$
  - $resCr(x,y) \rightarrow F2(x,y) \rightarrow T \rightarrow Q(\,Qp + offsetQp2\,) \rightarrow E$
- Decoder:
  - $invE \rightarrow invQ(\,Qp + offsetQp1\,) \rightarrow invT \rightarrow resCb(x,y)' \rightarrow invF1(x,y) \rightarrow resCb(x,y)''$
  - $invE \rightarrow invQ(\,Qp + offsetQp2\,) \rightarrow invT \rightarrow resCr(x,y)' \rightarrow invF2(x,y) \rightarrow resCr(x,y)''$
  - $recCb(x,y) = predCb(x,y) + resCb(x,y)''$
  - $recCr(x,y) = predCr(x,y) + resCr(x,y)''$ At video decoder 300 in Table 1, after entropy decoding (invE), inverse quantization (invQ), inverse transformation (invT), the inverse RMFs $invF1(x,y)$ and $invF2(x,y)$ are applied to the decoded residuals, $resCb(x,y)'$ and $resCr(x,y)'$, to obtain the residuals $resCb(x,y)''$ and $resCr(x,y)''$, that are added to the predictions, $predCb(x,y)$ and $predCr(x,y)$, to obtain the reconstructions, $recCb(x,y)$ and $recCr(x,y)$.

In one example, the functions F1 and F2 are subtraction and summation, respectively, and the inverse functions invF1 and invF2 are summation and subtraction, respectively. Normalizing factors 1/N1, 1/N2, 1/M1, 1/M2 and rounding terms A1, A2, B1, B2 may be part of these functions:

i) $F1(x,y)=(resCb(x,y)-resCr(x,y)+A1)/N1$ (Eq. 1.a.i)

ii) $F2(x,y)=(resCb(x,y)+resCr(x,y)+A2)/N2$ (Eq. 1.a.ii)

iii) $invF1(x,y)=(resCr(x,y)'+resCb(x,y)'+B1)/M1$ (Eq. 1.a.iii)

iv) $invF2(x,y)=(resCr(x,y)'-resCb(x,y)'+B2)/M2$ (Eq. 1.a.iv)

In one example, N1=N2=2, A1=A2=1 (or 0), and M1=M2=1, B1=B2=0. In another example, N1=N2=M1=M2=$\sqrt{2}$ with the factor ($1/\sqrt{2}$) approximately equal to (181/256) and in this case A1=A2=B1=B2=128 (or 0). In some examples, all values of the residual blocks $resCb(x,y)$, $resCr(x,y)$, $resCb(x,y)'$ or $resCr(x,y)'$ may be zero or one or more residual blocks may be omitted from the equations above.

In another example, the functions F1 and F2 are summation and subtraction, respectively, and the inverse functions invF1 and invF2 are also summation and subtraction, respectively. Normalizing factors 1/N1, 1/N2, 1/M1, 1/M2 and rounding terms A1, A2, B1, B2 may be part of these functions:

i) $F1(x,y)=(resCb(x,y)+resCr(x,y)+A1)/N1$ (Eq. 1.b.i)

ii) $F2(x,y)=(resCb(x,y)-resCr(x,y)+A2)/N2$ (Eq. 1.b.ii)

iii) $invF1(x,y)=(resCb(x,y)'+resCr(x,y)'+B1)/M1$ (Eq. 1.b.iii)

iv) $invF2(x,y)=(resCb(x,y)'-resCr(x,y)'+B2)/M2$ (Eq. 1.b.iv)

In one example, N1=N2=2, A1=A2=1 (or 0), and M1=M2=1, B1=B2=0. In another example, N1=N2=M1=M2=$\sqrt{2}$ with the factor ($1/\sqrt{2}$) approximately equal to (181/256) and in this case A1=A2=B1=B2=128 (or 0). In some examples, all values of the residual blocks $resCb(x,y)$, $resCr(x,y)$, $resCb(x,y)'$ or $resCr(x,y)'$ may be zero, or one or more residual blocks may be omitted from the equations above.

In some examples, the functions F1 and F2 are subtraction and summation with unequal normalization factors, respectively, and the inverse functions invF1 and invF2 are summation and subtraction with unequal normalization factors, respectively. Normalizing factors 1/N10, 1/N11, 1/N20, 1/N21, 1/M10, 1/M11, 1/M20, 1/M21 and rounding terms A10, A11, A20, A21, B10, B11, B20, B21 may be part of these functions:

i) $F1(x,y)=(resCb(x,y)+A10)/N10-(resCr(x,y)+A11)/N11$ (Eq. 1.c.i)

ii) $F2(x,y)=(resCb(x,y)+A20)/N20+(resCr(x,y)+A21)/N21$ (Eq. 1.c.ii)

iii) $invF1(x,y)=(resCr(x,y)'+B10)/M10+(resCb(x,y)'+B11)/M11$ (Eq. 1.c.iii)

iv) $invF2(x,y)=(resCr(x,y)'+B20)/M20-(resCb(x,y)'+B21)/M21$ (Eq. 1.c.iv)

In one example, N10=N11=1 and A10=A11=0; N20=N21=2 and A20=A21=0; M10=1 and B10=0; M11=2 and B11=1; M20=1 and B20=0; M21=2 and B21=0 in equations 1.c.i, 1.c.ii, 1.c.iii, and 1.c.iv. Thus, in this example, Equations 1.c.i, 1.c.ii, 1.c.iii, and 1.c.iv may be rewritten as:

i) $F1(x,y)=resCb(x,y)-resCr(x,y)$ (Eq. 1.c.v)

ii) $F2(x,y)=(resCb(x,y)+resCr(x,y))/2$ (Eq. 1.c.vi)

(1) $invF1(x,y)=resCr(x,y)'+(resCb(x,y)'+1)/2$ (Eq. 1.c.vii)

(2) $invF2(x,y)=resCr(x,y)'-resCb(x,y)'/2$ (Eq. 1.c.viii)

All values of the residual blocks $resCb(x,y)$, $resCr(x,y)$, $resCb(x,y)'$ or $resCr(x,y)'$ may be zero, or one or more residual blocks may be omitted from the equations above.

In some examples of this disclosure, the CRS process may be applied together with the RMFs. For instance, in an example where the CRS process is applied together with the RMFs, the RMFs $F1(x,y)$ and $F2(x,y)$ may be applied (e.g., by video encoder 200) after CRS has scaled the residuals $resCb(x,y)$ and $resCr(x,y)$. Inversely, in this example, the inverse RMFs $invF1(x,y)$ and $invF2(x,y)$ are applied (e.g., by video decoder 300) before the invCRS scaling process.

In another example where the CRS process is applied together with the RMFs, the RMFs F1(x,y) and F2(x,y) may be applied by video encoder 200 before CRS has scaled the residuals resCb(x,y) and resCr(x,y). Inversely, in this example, the inverse RMFs invF1(x,y) and invF2(x,y) are applied by video decoder 300 after the invCRS scaling process.

In some examples, the normalization factors 1/N, 1/M, and rounding terms A, B as defined above, may be integrated with the transform coefficient scaling process that is part of the forward transform process T, and inversely, with the inverse transform coefficient scaling that is part of the inverse transform process invT. In other words, the normalization factors and scaling terms may be combined. In some such examples, the CRS scaling process is not applied (e.g., by video encoder 200 or video decoder 300). In some examples where the normalization factors and rounding terms are integrated with the transform coefficient scaling process that is part of the forward transform process T, the CRS scaling process is applied before the RMFs F1(x,y) and F2(x,y), and inversely, the inverse RMFs invF1(x,y) and invF2(x,y) are applied before the invCRS scaling process.

In some examples where the normalization factors and rounding terms are integrated with the transform coefficient scaling process that is part of the forward transform process T, the RMFs F1(x,y) and F2(x,y) may be applied before CRS has scaled the residuals resCb(x,y) and resCr(x,y), and inversely, the inverse RMFs invF1(x,y) and invF2(x,y) may be applied after the invCRS scaling process. In this case, the CRS scaling may also be integrated with the transform coefficient scaling process that is part of the forward transform process T, and inversely, with the inverse transform coefficient scaling that is part of the inverse transform process invT.

Alternatively, in examples where the normalization factors and rounding terms are integrated with the transform coefficient scaling process that is part of the forward transform process T, the normalization factors 1/N, 1/M, and rounding terms A, B as defined above may be fully or partially replaced by a modified quantization parameter value (offsetQp in Table 1).

Furthermore, in some examples of this disclosure, the RMFs F1(x,y), F2(x,y) may be applied (e.g., by video encoder 200) after the forward transform process T and before the quantization Q. Inversely, the inverse RMFs invF1(x,y), invF2(x,y) may be applied (e.g., by video decoder 300) after the inverse quantization invQ and before the inverse transform process invT.

In this example, transform skip mode may be applied together with combined residual coding. Thus, in some examples, video encoder 200 does not apply the forward transform (e.g., DCT, DST, etc.) but does apply the RMFs. Likewise, in some examples, video decoder 300 does not apply the inverse transform (e.g., inverse DCT, inverse DST, etc.) but does apply the inverse RMFs.

In a similar manner as described above, the luma residual block resY(x,y) corresponding with the chroma residual blocks resCb(x,y) and resCr(x,y) may be combined together. For instance, in one such example, an RMF F3(x,y) is applied (e.g., by video encoder 200) to resY(x,y) together with resCb(x,y). Additionally, an RMF F4(x,y) is applied (e.g., by video encoder 200) to resY(x,y) together with resCr(x,y). Furthermore, in this example, inversely, an inverse RMF for F3 (i.e., invF3(x,y)) and an inverse RMF for F4 (i.e., invF4(x,y)) are applied (e.g., by video decoder 300). In one example, F3, F4, invF3, and invF4 may be expressed as:

$$F3=(A1*resY+B1*resCB+D1)/N1$$

$$F4=(A2*resY+B2*resCR+D2)/N2$$

$$invF3=(A3*F3-B3*F4+D3)/N3$$

$$invF4=(A4*F3-B4*F4+D4)/N4$$

In another example where the luma residual block corresponding to the chroma residual blocks are combined together, a RMF F5(x,y) is applied (e.g., by video encoder 200) to resY(x,y) together with resCb(x,y) and resCr(x,y). Inversely, invF5(x,y) is applied (e.g., by video decoder 300). In one example, F5 and invF5 may be expressed as:

$$F5=(A1*resY+B1*resCB+C1*resCR+D1)/N1$$

$$invF5=(A3*F5+D3)/N3$$

In the case of, for example, the 4:2:0 chroma video format, the RMFs F3, F4, F5 may include down-sampling (with or without filtering) of the resY(x,y) residual block or up-sampling (with or without interpolation) of the resCb(x,y) and resCr(x,y) blocks. The CRC techniques of this disclosure may also be applied to the 4:4:4 video format, etc., in which case no down-sampling or up-sampling may be needed.

The CRC tool of this disclosure may be enabled by signaling a binary flag in the SPS, PPS, slice or tile group headers, etc. In addition, a CRC flag (crc_flag) may be signaled in the transform unit syntax, or residual coding syntax to enable the CRC tool for the transform unit. Accordingly, video encoder 200 may signal the CRC flag in the bitstream and video decoder 300 may obtain the CRC flag from the bitstream.

In some examples, signaling of the CRC flag is dependent on the occurrence of specific criteria. For instance, in one example, the crc_flag may be signaled (e.g., by video encoder 200) if the coded block flag (cbf) of the Cb residual block (cbf_cb) is true. The cbf of a residual block indicates whether or not all of the values of the transform coefficients of the residual block are zero. In cases where transform skip mode is applied, the transform coefficients of the residual block may be in the sample domain. In a second example, the crc_flag may be signaled (e.g., by video encoder 200) if the coded block flag (cbf) of the Cr residual block (cbf_cr) is true. In a third example, the crc_flag may be signaled (e.g., by video encoder 200) if the cbf_cb is true or the cbf_cr is true. In yet another example, the crc_flag may be signaled (e.g., by video encoder 200) if the cbf_cb and the cbf_cr are true.

In the example where the crc_flag is signaled if the cbf_cb is true and the cbf_cr is also true, a second flag may be signaled (e.g., by video encoder 200) for each transform unit indicating whether both the residuals (F1(x,y) and F2(x,y), as defined in Eq. 1.a.i) and 1.a.ii)) or only one out of the two residuals are signaled, i.e., by forcing either F1(x,y) or F2(x,y) to zero. The forcing may be either fixed (e.g., only F2(x,y) can be forced to zero, not F1(x,y)); or variable (where either F1(x,y) or F2(x,y) can be forced to zero). For the latter case, another flag may be signaled to indicate which residual is forced to zero. One motivation for doing so is that forcing one residual to zero may be cheap in terms of rate but may cause more distortion. So, video encoder 200 may have the flexibility to tune itself in terms of rate-distortion trade-off. In another example, these flags (number of residuals signaled, and which residual is forced to zero)

can be signaled at SPS, PPS, slice or tile group headers instead of at the transform unit level.

In some examples, the crc_flag may be context coded or bypass coded (e.g., by video encoder 200 and video decoder 300). Multiple contexts may be used with the context dependent on cbf_cb or cbf_cr values, on neighboring or current block modes (intra, inter, current picture referencing, etc.), on transform skip flag, on block dimension characteristics (width, height, ratio), on whether dual or shared coding tree is used, etc. Furthermore, different contexts for the crc_flag may be applied depending on whether cbf_cr is true or not, when the crc_flag is parsed after the cbf_cr. Different contexts for cbf_cr may be applied depending on the value of crc_flag for the case when the crc_flag is parsed before cbf_cr. New contexts may be defined depending on the crc flag value, or the existing contexts for cbf_cr component may be modified depending on the crc_flag value.

In some examples, one or more CRC methods may be available to code the samples (e.g., one method may involve RMFs $F1_A(x,y)$ and $F2_A(x,y)$ and another method may involve RMFs $F1_B(x,y)$ and $F2_B(x,y)$). A determination of the CRC method to be used by a coder may be made (e.g., by video encoder 200 and video decoder 300) by one or more of the following examples. In one example, a list of available (or possible) CRC methods may be determined by analyzing a correlation between high-pass filtered versions of the original Cb and Cr components. This analysis may occur offline and may be based on a wide variety of content to determine which CRC methods provide compression efficiency gains. In some examples, the list of available (or possible) CRC methods may be determined by analyzing the picture textures or block texture and mapping the features to the lists. The different CRC methods may use different RMFs. The CRC method to be used may be determined by an indication in the bitstream (e.g., a flag or an index to the list of CRC methods) specifying the CRC method to be used. Alternatively, video encoder 200 and video decoder 300 may determine the CRC method based on one or more characteristics of the block. Such characteristics may include, but are not limited to, whether the slice or tile group types are intra or inter type, CPR (current picture referencing), whether dual or shared coding tree is used, residual block dimensions or aspect ratios, or other characteristics of the block. Video encoder 200 and video decoder 300 may code, based on the determination, one or more components of the video using the CRC method determined.

Furthermore, in some examples of this disclosure, the quantization parameter value Qp that is used by the forward and inverse quantization processes, Q and invQ, may be modified by offsetQp1 and offsetQp2 values as illustrated in Table 1. These offsetQp values may be default values or they may be signaled in the bitstream (SPS, PPS, adaptation parameter set (APS), slice or tile group headers, unit headers, etc.). The default values or signaled values may be dependent on whether the slice or tile group types are intra or inter type, CPR (current picture referencing), whether dual or shared coding tree is used, residual block dimensions or aspect ratios, etc. The signaling may be dependent on whether a flag indicates that the combined residual coding tool is enabled or disabled.

In some examples, a CRC method may be disallowed for blocks with certain characteristics. For example, a CRC method may be disallowed for blocks that have fewer than a threshold number (e.g., 16) of samples. In other examples, other characteristics of the block including, but not limited to, width, height, aspect ratio, neighboring block characteristics, signaled values of cbf flags or other syntax elements, etc., may be used to specify blocks where a CRC method may be disallowed.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 5A:
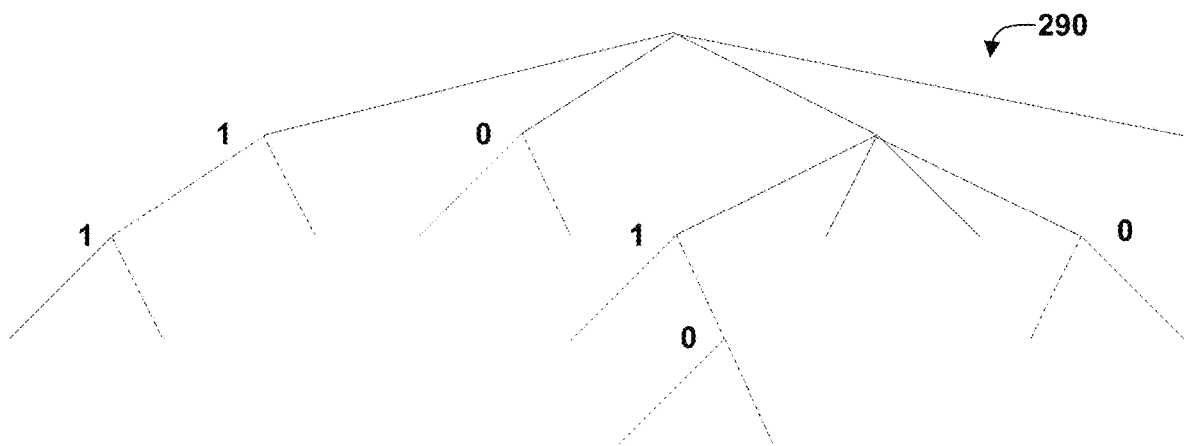
FIGS. 5A and 5B are conceptual diagrams illustrating an example quadtree binary tree (QTBT) structure, and a corresponding coding tree unit (CTU).
Figure 5B:
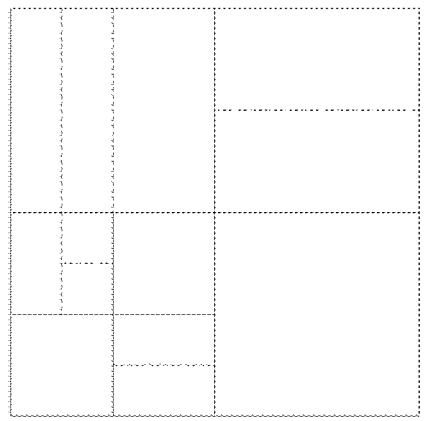

FIGS. 5A and 5B are conceptual diagram illustrating an example quadtree binary tree (QTBT) structure 290, and a corresponding coding tree unit (CTU) 292. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 290 (i.e., the solid lines) and syntax elements (such as splitting information) for a prediction tree level (i.e., the second level) of QTBT structure 290 (i.e., the dashed lines). Video encoder 200 may encode, and video decoder 300 may decode, video data, such as prediction and transform data, for CUs represented by terminal leaf nodes of QTBT structure 290.

In general, CTU 292 of FIG. 5B may be associated with parameters defining sizes of blocks corresponding to nodes of QTBT structure 290 at the first and second levels. These parameters may include a CTU size (representing a size of CTU 292 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 290 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 290 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 6:
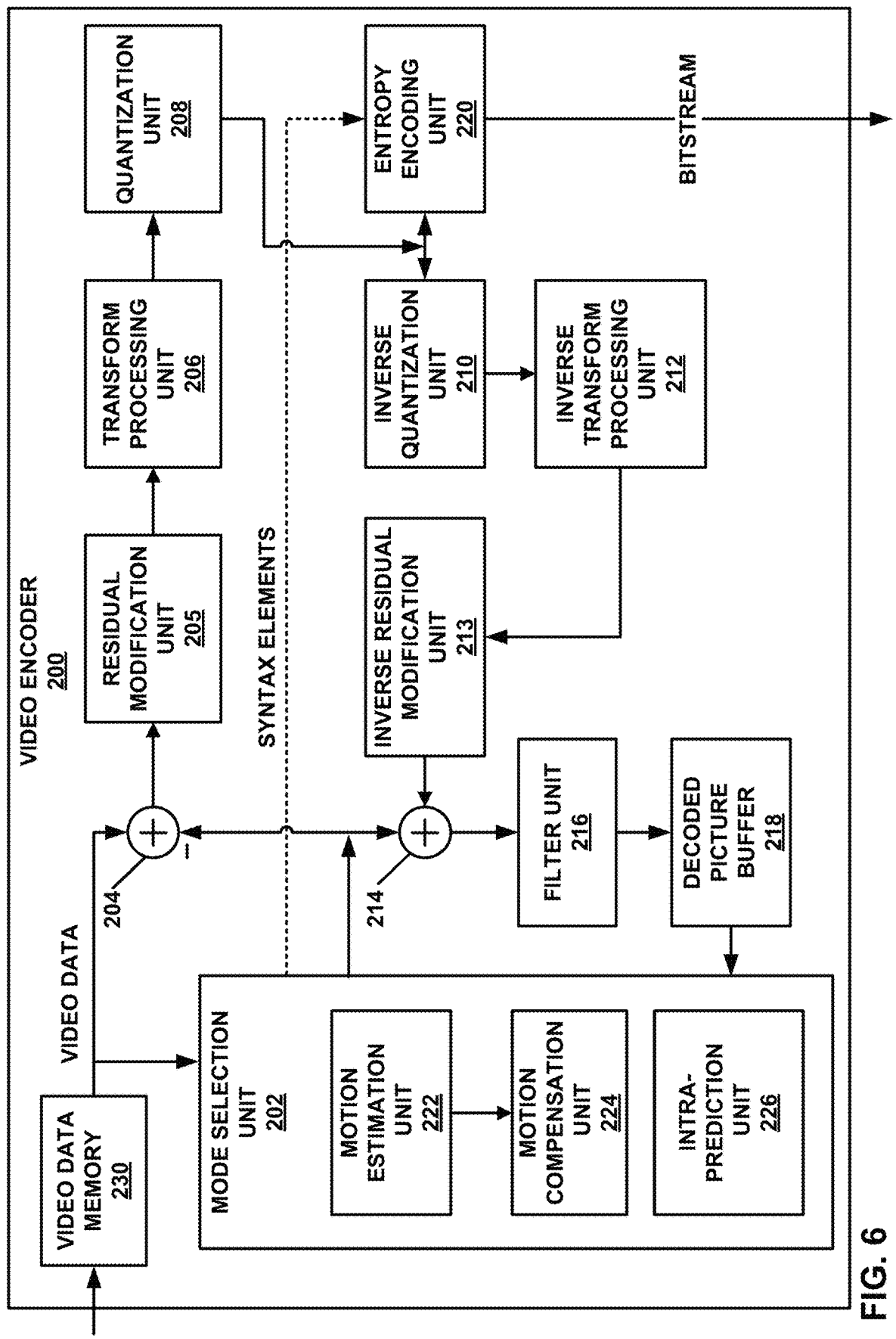
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Furthermore, in the example of FIG. 6, video encoder 200 may include a residual modification unit 205 and an inverse residual modification unit 213. Any or all of video data memory 230, mode selection unit 202, residual generation unit 204, residual modification unit 205, transform processing unit 206, quantization unit 208, inverse quantization unit 210, inverse transform processing unit 212, inverse residual modification unit 213, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. The video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

In accordance with one or more techniques of this disclosure, residual modification unit 205 may apply RMFs to residual chroma data generated by residual generation unit 204. For example, residual modification unit 205 may apply a first residual modification function to first chroma residual data of a block of the video data to generate first modified chroma residual data. Residual modification unit 205 may apply a second residual modification function to second chroma residual data of the block to generate second modified chroma residual data. In this example, the first chroma residual data is associated with a first chroma component (e.g., Cb) and the second chroma residual data is associated with a second chroma component (e.g., Cr). Residual modification unit 205 does not apply RMFs to residual luma data.

Transform processing unit 206 applies one or more transforms to a residual block (e.g., a block of modified residual data generated by applying an RMF) to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. In accordance with one or more examples of this disclosure, inverse residual modification unit 213 may apply inverse RMFs to the decoded modified chroma residual data generated by inverse transform processing unit 212. The inverse RMFs applied by inverse residual modification unit 213 may be the inverses of the RMFs applied by residual modification unit 205. Thus, inverse residual modification unit 213 may generate residual blocks. Inverse residual modification unit 213 does not apply inverse RMFs to residual luma data.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to apply a first residual modification function to first chroma residual data to generate first modified chroma residual data; encode the first modified chroma residual data; apply a second residual modification function to second chroma residual data to generate second modified chroma residual data; and encode the second modified chroma residual data, wherein the first chroma residual data is associated with a first chroma component and the second chroma residual data is associated with a second chroma component.

Figure 7:
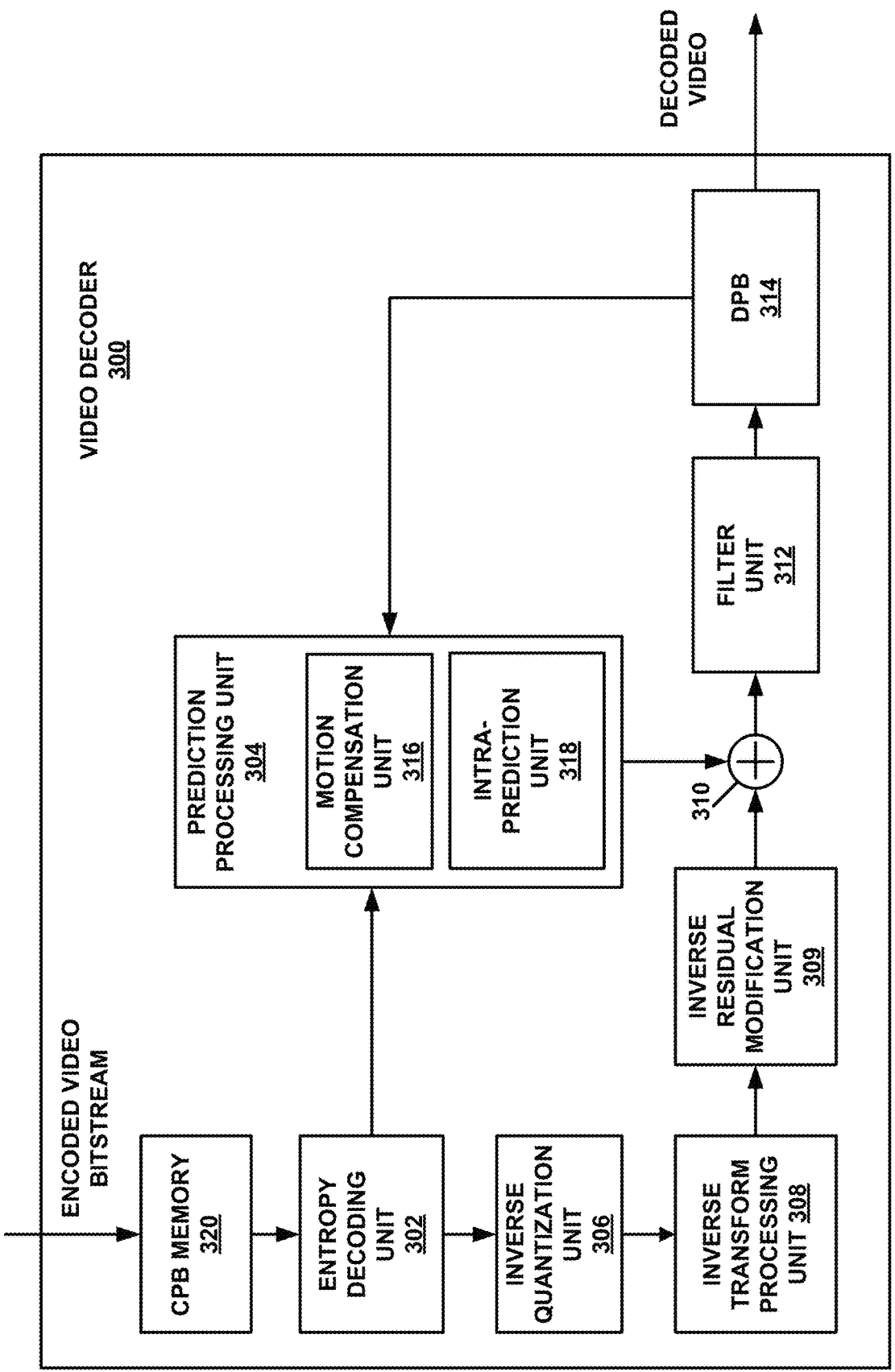
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. In accordance with one or more techniques of this disclosure, video decoder 300 also includes an inverse residual modification unit 309. Any or all of CPB memory 320, entropy decoding unit 302, prediction processing unit 304, inverse quantization unit 306, inverse transform processing unit 308, inverse residual modification unit 309, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decode the video data to reproduce syntax elements. Prediction processing unit 304, inverse quantization unit 306, inverse transform processing unit 308, inverse residual modification unit 309, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. In accordance with one or more examples of this disclosure, inverse transform processing unit 308 may apply one or more inverse transforms to the transform coefficient block to generate decoded modified chroma residual data. In one example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. Because the current block may include a luma component and two chroma components, inverse transform processing unit 308 may generate decoded luma residual data, first decoded modified chroma residual data, and second decoded modified chroma residual data for the current block.

In accordance with one or more techniques of this disclosure, inverse residual modification unit 309 may apply inverse RMFs to the decoded modified chroma residual data. Thus, inverse residual modification unit 309 may apply a first inverse residual modification function to first decoded modified chroma residual data (e.g., Cb residual data) to generate first inverse modified chroma residual data. Additionally, inverse residual modification unit 309 may apply a second inverse residual modification function to second decoded modified chroma residual data (e.g., Cr residual data) to generate second inverse modified chroma residual data.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block (e.g., a block of residual chroma data generated by inverse residual modification unit 309). For example, reconstruction unit 310 may add samples of the residual block to corresponding samples of the prediction block to reconstruct the current block. In accordance with the techniques of this disclosure, the residual block may be inverse modified chroma residual data generated by inverse residual modification unit 309.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to apply a first inverse residual modification function to first decoded modified chroma residual data to generate first inverse modified chroma residual data; apply a second inverse residual modification function to second decoded modified chroma residual data to generate second inverse modified chroma residual data, wherein the first decoded modified chroma residual data is associated with a first chroma component and the second decoded modified chroma residual data is associated with a second chroma component; and reconstruct a block of the video data based on the first inverse modified chroma residual data and the second inverse modified chroma residual data.

Figure 8:
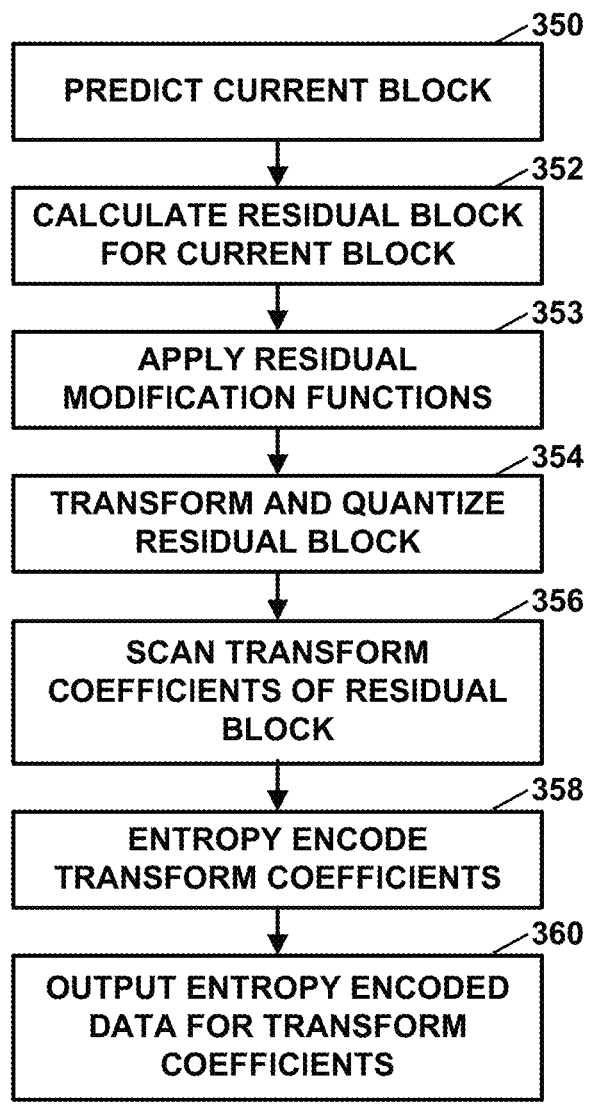
FIG. 8 is a flowchart illustrating an example method for encoding a current block.

FIG. 8 is a flowchart illustrating an example method for encoding a current block. The current block may include a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may then calculate residual blocks for the current block (352). In other words, video encoder 200 may calculate luma residual data and chroma residual data for the current block. To calculate a residual block, video encoder 200 may calculate a difference between samples of the original, unencoded block and corresponding samples of the prediction block for the current block. For example, to calculate a Cb residual block, video encoder 200 may calculate a difference between Cb samples of the original, unencoded block and corresponding Cb samples of the prediction block for the current block.

In accordance with one or more techniques of this disclosure, video encoder 200 may apply residual modification functions to chroma residual data of the current block to generate modified chroma residual data (353). Video encoder 200 may then transform the residual block to generate transform coefficients and quantize the transform coefficients of the residual block (354). That is, video encoder 200 may then apply a forward transform that converts the modified chroma residual data to a transform domain, such as a frequency domain, thereby generating transform coefficients. Video encoder 200 may then quantize the transform coefficients. In other examples, video encoder 200 may apply the residual modification functions after applying the forward transform.

Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 9:
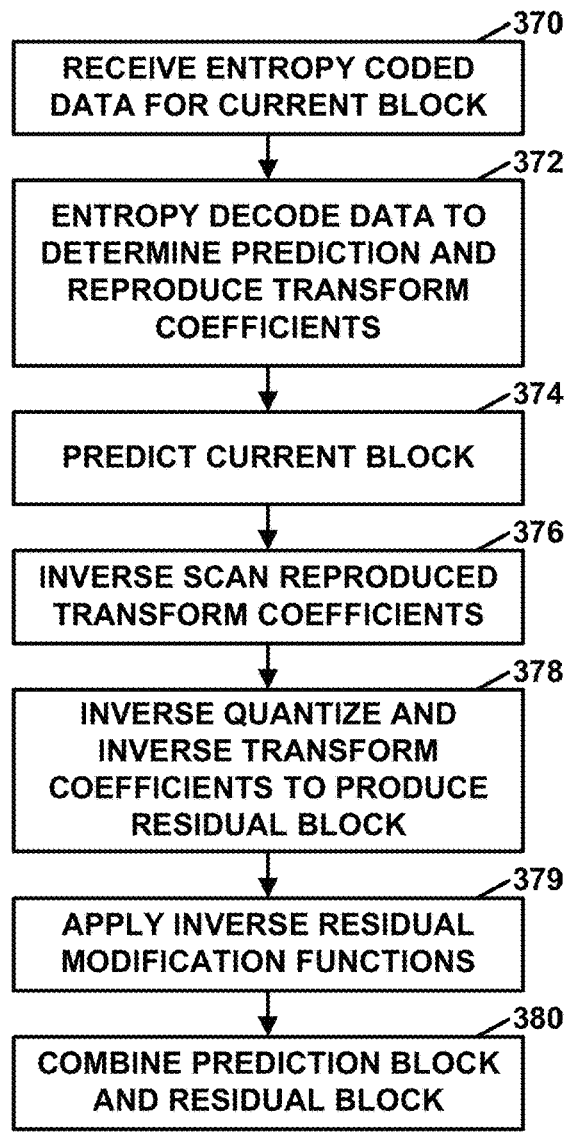
FIG. 9 is a flowchart illustrating an example method for decoding a current block of video data.

FIG. 9 is a flowchart illustrating an example method for decoding a current block of video data. The current block may include a current CU. Although described with respect to video decoder 300 (FIGS. 1 and 7), it should be understood that other devices may be configured to perform a method similar to that of FIG. 9.

Video decoder 300 may receive entropy coded data for the current block, such as entropy coded prediction information and entropy coded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may perform actions 372-378 for each color component of the current block. Thus, video decoder 300 may produce a Y residual block, a Cb residual block, and a Cr residual block for the current block. The Cb residual block may be first decoded residual chroma data and the Cr residual block may be second decoded residual chroma data. In other examples, the Cr residual block may be considered the first decoded residual chroma data and the Cb residual block may be considered the second decoded residual chroma data. In accordance with one or more techniques of this disclosure, video decoder 300 may apply inverse residual modification functions to decoded residual chroma data (379). Video decoder 300 may apply the inverse residual modification functions to the decoded residual chroma data in accordance with any of the examples provided elsewhere in this disclosure. In other examples, video decoder 300 may apply the inverse residual modification functions before applying the inverse transforms.

Video decoder 300 may ultimately decode the current block by combining the prediction block and the residual block (380). For example, video decoder 300 may, for each of the color components, add samples of the color component of the prediction block to corresponding samples of residual block for the color component.

Figure 10:
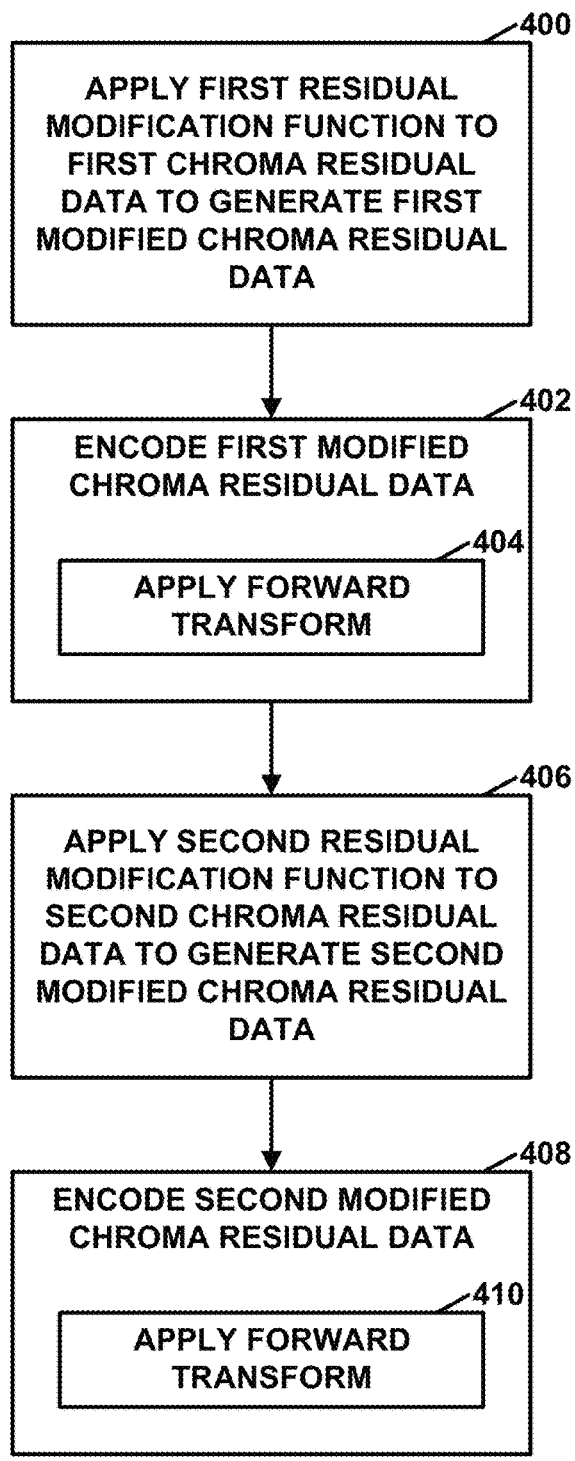
FIG. 10 is a flowchart illustrating an example operation of a video encoder, in accordance with one or more techniques of this disclosure.

FIG. 10 is a flowchart illustrating an example operation of video encoder 200, in accordance with one or more techniques of this disclosure. In the example of FIG. 10, video encoder 200 may apply a first residual modification function to first chroma residual data of a block of the video data to generate first modified chroma residual data (400). For example, video encoder 200 may apply the residual modification functions as described in any of Equations 1.a.i, 1.b.i, 1.c.i, 1.c.v, or another residual modification function.

Additionally, in the example of FIG. 10, video encoder 200 may encode the first modified chroma residual data (402). As part of encoding the first modified chroma residual data, video encoder 200 may apply a forward transform (e.g., a discrete cosine transform, discrete sine transform, or another type of transform) that converts the first modified chroma residual data from the sample domain to a transform domain, such as a frequency domain (404). Data in the sample domain indicates values of samples (e.g., luma values, Cb values, Cr values). By applying the forward transform to the first modified chroma residual data, video encoder 200 may generate a first block of transform coefficients. Furthermore, as part of encoding the first modified chroma residual data, video encoder 200 may quantize the transform coefficients in the first block of transform coefficients. Additionally, video encoder 200 may apply entropy encoding to syntax elements representing the quantized first block of transform coefficients. In some examples, video encoder 200 may skip application of the forward transform. In other words, video encoder 200 may use transform skip mode with the current block. For ease of explanation, this disclosure may use the term "transform coefficients" to apply to residual data if transform skip mode is used with the current block.

Furthermore, video encoder 200 may apply a second residual modification function to second chroma residual data of the block to generate second modified chroma residual data (406). For example, video encoder 200 may apply the residual modification functions as described in any of Equations 1.a.ii, 1.b.ii, 1.c.ii, 1.c.vi, or another residual modification function.

Video encoder 200 may encode the second modified chroma residual data (408). The first chroma residual data is associated with a first chroma component and the second chroma residual data is associated with a second chroma component. As part of encoding the second modified chroma residual data, video encoder 200 may apply a forward transform (e.g., a discrete cosine transform, discrete sine transform, or another type of transform) that converts the second modified chroma residual data from the sample domain to a transform domain, such as a frequency domain (410). By applying the forward transform to the second modified chroma residual data, video encoder 200 may generate a second block of transform coefficients. Furthermore, as part of encoding the second modified chroma residual data, video encoder 200 may quantize the transform coefficients in the second block of transform coefficients. Additionally, video encoder 200 may apply entropy encoding to syntax elements representing the quantized second block of transform coefficients. In some examples, video encoder 200 may skip application of the forward transform.

In some examples, prior to applying the first residual modification function, video encoder 200 may determine whether to apply the first residual modification function or a third residual modification function to the first chroma residual data to generate the first modified chroma residual data. Similarly, prior to applying the second residual modification function, video encoder 200 may determine whether to apply the second residual modification function or a fourth residual modification function to the second chroma residual data to generate the second modified chroma residual data. Thus, video encoder 200 may determine which residual modification function to apply to the first residual chroma data and the second residual chroma data.

Video encoder 200 may determine which residual modification function to apply in one of a variety of ways. For instance, in some examples, video encoder 200 may determine, based on one or more characteristics of the block, whether to apply the first residual modification function or the third residual modification function to the first chroma residual data to generate the first modified chroma residual data. Furthermore, video encoder 200 may determine, based on the one or more characteristics of the block, whether to apply the second residual modification function or the fourth residual modification function to the second chroma residual data to generate the second modified chroma residual data. Such characteristics of the block may include one or more of: whether a slice or tile that contains the block is an intra type or an inter type, whether current picture referencing is used with the block, whether a dual or shared coding tree is used with the block, dimensions of the block, an aspect ratio of the block, or other characteristics of the block. For example, video encoder 200 may make the determination to use the first residual modification function if the block is in an I slice or the third residual modification if the block is in a P or B slice. An I slice is a slice in which intra prediction is allowed, but not inter prediction. A P slice is a slice in which intra prediction and unidirectional inter prediction are allowed, but not bidirectional inter prediction. A B slice is a slice in which intra prediction, unidirectional inter prediction, and bidirectional inter prediction are allowed.

In some examples, video encoder 200 may signal, in a bitstream, data indicating whether the first residual modification function or the third residual modification function was applied to the first chroma residual data to generate the first modified chroma residual data. Similarly, video encoder 200 may signal, in the bitstream, data indicating whether the second residual modification function or the fourth residual modification function was applied to the second chroma residual data to generate the second modified chroma residual data. For instance, one or more syntax elements signaled in the bitstream may specify which residual modification function was applied.

In some examples, video encoder 200 may apply CRS processes along with applying the residual modification functions. For instance, in some examples, video encoder 200 may apply a CRS process to the first inverse modified chroma residual data after applying the first inverse residual modification function to the first chroma residual data to generate the first modified chroma residual data. Additionally, in this example, video encoder 200 may apply the CRS process to the second modified chroma residual data after applying the second residual modification function to the second chroma residual data to generate the second modified chroma residual data. For instance, to apply the CRS process, video encoder 200 may apply Equation 7, as described elsewhere in this disclosure.

In other examples, video encoder 200 may apply a CRS process to the first chroma residual data as part of applying the first residual modification function to the first chroma residual data to generate the first modified chroma residual data. Additionally, in this example, video encoder 200 may apply the CRS process to the second chroma residual data as part of applying the second residual modification function to the second chroma residual data to generate the second modified chroma residual data. Video encoder 200 may apply the CRS process as part of applying the first and second residual modification function in accordance with any of the examples provided elsewhere in this disclosure.

Figure 11:
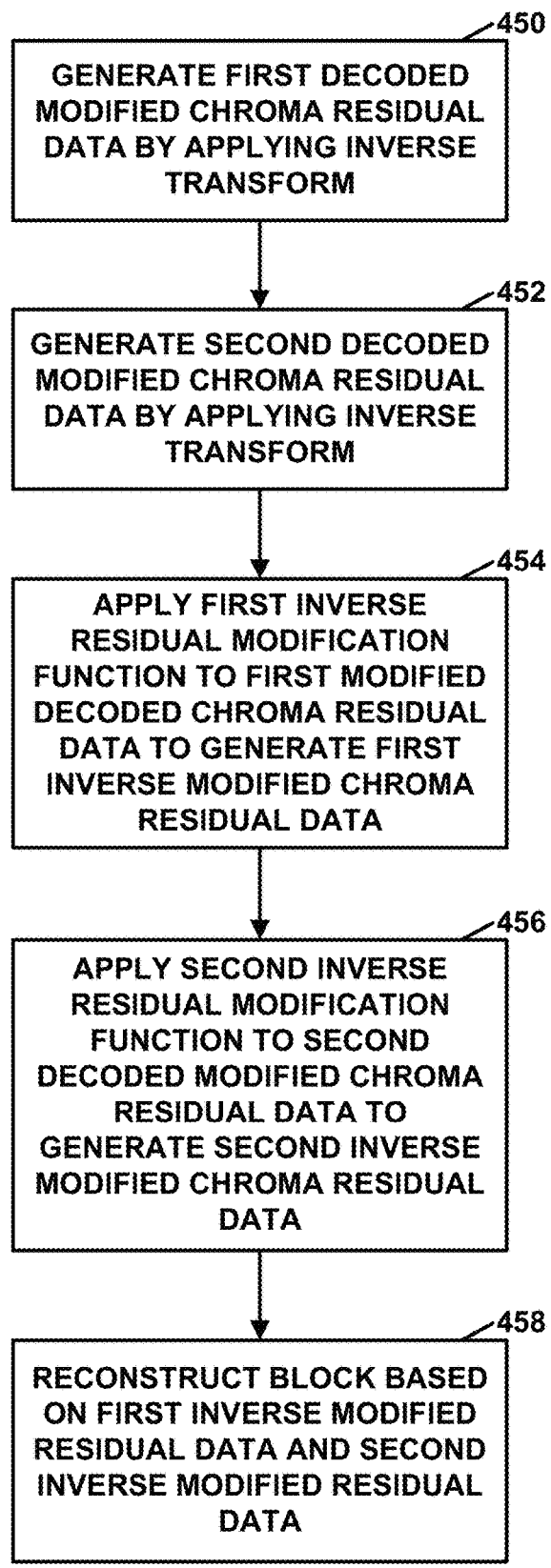
FIG. 11 is a flowchart illustrating an example operation of a video decoder, in accordance with one or more techniques of this disclosure.

FIG. 11 is a flowchart illustrating an example operation of video decoder 300, in accordance with one or more techniques of this disclosure. In the example of FIG. 11, video decoder 300 may generate first decoded modified chroma residual data by applying an inverse transform to convert a first set of transform coefficients of a block of the video data from a transform domain to a sample domain (450). For example, video decoder 300 may apply an inverse DCT transform that converts the first set of transform coefficients from a frequency domain to the sample domain. Additionally, video decoder 300 may generate second decoded modified chroma residual data by applying the inverse transform to convert a second set of transform coefficients of the block from the transform domain to the sample domain (452). The first decoded modified chroma residual data is associated with a first chroma component (e.g., Cb) and the second decoded modified chroma residual data is associated with a second chroma component (e.g., Cr).

Furthermore, in the example of FIG. 11, video decoder 300 may apply a first inverse residual modification function to the first decoded modified chroma residual data to generate first inverse modified chroma residual data (454). For example, video decoder 300 may apply an inverse residual modification function as described in any of Equations 1.a.iii, 1.b.iii, 1.c.iii, 1.c.vii, or another inverse residual modification function.

Video decoder 300 may apply a second inverse residual modification function to the second decoded modified chroma residual data to generate second inverse modified chroma residual data (456). For example, video decoder 300 may apply an inverse residual modification function as described in any of Equations 1.a.iv, 1.b.iv, 1.c.iv, 1.c.viii, or another inverse residual modification function.

Additionally, video decoder 300 may reconstruct a block of the video data based on the first inverse modified chroma residual data and the second inverse modified chroma residual data (458). For example, video decoder 300 may add samples of the first inverse modified chroma residual data to corresponding samples of the prediction block for the first chroma component. Additionally, in this example, video decoder 300 may add samples of the second inverse modified chroma residual data to corresponding samples of the prediction block for the second chroma component. In other words, video decoder 300 may add the first inverse modified chroma residual data to first predicted chroma data to obtain first reconstructed chroma data of the block and add the second inverse modified chroma residual data to second predicted chroma data to obtain second reconstructed chroma data of the block.

In some examples, prior to applying the first inverse residual modification function, video decoder 300 may determine whether to apply the first inverse residual modification function or a third inverse residual modification function to the first decoded modified chroma residual data to generate the first inverse modified chroma residual data. Similarly, prior to applying the second inverse residual modification function, video decoder 300 may determine whether to apply the second inverse residual modification function or a fourth inverse residual modification function to the second decoded modified chroma residual data to generate the second inverse modified chroma residual data. Thus, video decoder 300 may determine which residual modification function to apply to the first decoded residual chroma data and the second decoded residual chroma data.

Video decoder 300 may determine which inverse residual modification function to apply in one of a variety of ways. For instance, in some examples, video decoder 300 may determine, based on one or more characteristics of the block, whether to apply the first inverse residual modification function or the third inverse residual modification function to the first decoded modified chroma residual data to generate the first inverse modified chroma residual data. Furthermore, video decoder 300 may determine, based on the one or more characteristics of the block, whether to apply the second inverse residual modification function or the fourth inverse residual modification function to the second decoded modified chroma residual data to generate the second inverse modified chroma residual data. Such characteristics of the block may include one or more of: whether a slice or tile that contains the block is an intra type or an inter type, whether current picture referencing is used with the block, whether a dual or shared coding tree is used with the block, dimensions of the block, an aspect ratio of the block, or other characteristics of the block. For example, video decoder 300 may make the determination to use the first inverse residual modification function if the block is in an I slice or the third inverse residual modification if the block is in a P or B slice.

In some examples, video decoder 300 may determine, based on data signaled in a bitstream, whether to apply the first inverse residual modification function or the third inverse residual modification function to the first decoded modified chroma residual data to generate the first inverse modified chroma residual data. Similarly, video decoder 300 may determine, based on the data signaled in the bitstream, whether to apply the second inverse residual modification function or the fourth inverse residual modification function to the second decoded modified chroma residual data to generate the second inverse modified chroma residual data. For instance, one or more syntax elements signaled in the bitstream may specify which inverse residual modification function to use.

In some examples, video decoder 300 may apply inverse CRS processes along with applying the inverse residual modification functions. For instance, in some examples, video decoder 300 may apply an inverse CRS process to the first decoded modified chroma residual data before applying the first inverse residual modification function to the first decoded modified chroma residual data to generate the first inverse modified chroma residual data. Additionally, in this example, video decoder 300 may apply the inverse CRS process to the second decoded modified chroma residual data before applying the second inverse residual modification function to the second decoded modified chroma residual data to generate the second inverse modified chroma residual data. For instance, to apply the inverse CRS process, video decoder 300 may apply Equation 8, as described elsewhere in this disclosure.

In other examples, video decoder 300 may apply an inverse CRS process to the first decoded modified chroma residual data as part of applying the first inverse residual modification function to the first decoded modified chroma residual data to generate the first inverse modified chroma residual data. Additionally, in this example, video decoder 300 may apply the inverse CRS process to the second decoded modified chroma residual data as part of applying the second inverse residual modification function to the second decoded modified chroma residual data to generate the second inverse modified chroma residual data.

The following enumerated paragraphs provide a non-limited list of examples of the techniques of this disclosure.

Example 1A

A method of decoding video data, the method comprising: applying a first inverse residual modification function to first decoded chroma residual data (i.e., first decoded modified chroma residual data in the context of video decoding) to generate first modified decoded chroma residual data (i.e., first inverse modified decoded chroma residual data in the context of video decoding); applying a second inverse residual modification function to second decoded chroma residual data (i.e., first decoded modified chroma residual data in the context of video decoding) to generate second modified decoded chroma residual data (i.e., second inverse modified decoded chroma residual data in the context of video decoding), wherein the first decoded chroma residual data is associated with a first chroma component and the second decoded chroma residual data is associated with a second chroma component; and reconstructing a block of the video data based on the first modified decoded chroma residual data and the second modified decoded chroma residual data.

Example 2A

The method of example 1A, wherein reconstructing the block comprises: adding the first modified decoded chroma residual data to first predicted chroma data to obtain first reconstructed chroma data of the block; and adding the second modified decoded chroma residual data to second predicted chroma data to obtain second reconstructed chroma data of the block.

Example 3A

The method of any of examples 1A-2A, wherein: the first inverse residual modification function is: $invF1(x,y)=(resCr(x,y)'+resCb(x,y)'+B1)/M1$, the second inverse residual modification function is: $invF2(x,y)=(resCr(x,y)'-resCb(x,y)'+B2)/M2$, where $resCb(x,y)'$ is the first decoded chroma residual data, $resCr(x,y)'$ is the second decoded chroma residual data, B1 and B2 are rounding terms, and 1/M1 and 1/M2 are normalizing factors.

Example 4A

The method of any of examples 1A-2A, wherein: the first inverse residual modification function is: $invF1(x,y)=(resCb(x,y)'+resCr(x,y)'+B1)/M1$, the second inverse residual modification function is: $invF2(x,y)=(resCb(x,y)'-resCr(x,y)'+B2)/M2$, where $resCb(x,y)'$ is the first decoded chroma residual data, $resCr(x,y)'$ is the second decoded chroma residual data, B1 and B2 are rounding terms, and 1/M1 and 1/M2 are normalizing factors.

Example 5A

The method of any of examples 1A-2A, wherein: the first inverse residual modification function is: $invF1(x,y)=(resCr(x,y)'+B10)/M10+(resCb(x,y)'+B11)/M11$, the second inverse residual modification function is: $invF2(x,y)=(resCr(x,y)'+B20)/M20-resCb(x,y)'+B21)/M21$, where $resCb(x,y)'$ is the first decoded chroma residual data, $resCr(x,y)'$ is the second decoded chroma residual data, B10, B11, B20 and B21 are rounding terms, and 1/M10, 1/M11, 1/M20, and 1/M21 are normalizing factors.

Example 6A

The method of any of examples 1A-5A, wherein the method further comprises: applying a first inverse chroma residual scaling (CRS) process to the first modified decoded chroma residual data; and applying a second inverse CRS process to the second modified decoded chroma residual data.

Example 7A

The method of any of examples 1A-6A, wherein: applying the first inverse residual modification function comprises applying the first inverse residual modification function after inverse quantizing the first decoded chroma residual data and before applying an inverse transform process, and applying the second inverse residual modification function comprises applying the second inverse residual modification function after inverse quantizing the second decoded chroma residual data and before applying the inverse transform process.

Example 8A

The method of any of examples 3A-5A, wherein $resCr(x,y)'$ or $resCb(x,y)'$ is substituted with $resY(x,y)'$, where $resY(x,y)'$ is decoded luma residual data.

Example 9A

The method of any of examples 1A-8A, further comprising obtaining, from a bitstream that includes an encoded representation of the video data, a flag indicating whether to apply the first inverse residual modification function and the second inverse residual modification function.

Example 10A

The method of example 9A, wherein the flag is signaled if a coded block flag (CBF) for the first chroma component is true and a CBF for the second chroma component is true.

Example 11A

The method of example 10A, wherein the flag is a first flag and the method further comprises obtaining, from the bitstream, a second flag, the second flag being for a transform unit, the second flag indicating which of the following applies: (i) both the first decoded chroma residual data and the second decoded chroma residual data are signaled, and (ii) only one of the first decoded chroma residual data and the second decoded chroma residual data is signaled.

Example 12A

The method of example 11A, the method further comprising obtaining, from the bitstream, a third flag indicating which of the first decoded chroma residual data and the second decoded chroma residual data is forced to zero.

Example 13A

The method of any of examples 9A-12A, wherein the flag indicating whether to apply the first inverse residual modification function and the second inverse residual modification function is a first flag and the method further comprises: obtaining, from the bitstream, a CBF for the first chroma component; selecting, based on the CBF for the first chroma component, a context for the first flag; and entropy decoding the first flag using the selected context.

Example 14A

The method of any of examples 9A-12A, wherein the flag indicating whether to apply the first inverse residual modification function and the second inverse residual modification function is a first flag and the method further comprises: selecting, based on the first flag, a context for a CBF for the first chroma component; and entropy decoding the CBF for the first chroma component using the selected context.

Example 15A

The method of any of examples 1A-14A, further comprising: determining the first inverse residual modification function from among a plurality of available first inverse residual modification functions; and determining the second inverse residual modification function from among a plurality of available second inverse residual modification functions.

Example 16A

The method of any of examples 1A-15A, further comprising: prior to applying the first inverse residual modification function to the first decoded chroma residual data: inverse quantizing first quantized chroma transform data based on a quantization parameter and a first quantization parameter offset; and applying an inverse transform to the inverse quantized first quantized chroma transform data to generate the first decoded chroma residual data, prior to applying the second inverse residual modification function to the second decoded chroma residual data: inverse quantizing second quantized chroma transform data based on the quantization parameter and a second quantization parameter offset; and applying the inverse transform to the second inverse quantized second quantized chroma transform data to generate the second decoded chroma residual data.

Example 17A

The method of example 16A, further comprising: obtaining at least one of the first quantization parameter offset or the second quantization parameter offset from a bitstream that comprises an encoded representation of the video data.

Example 18A

The method of any of examples 1A-17A, further comprising: determining, based on one or more characteristics of the block, whether application of the first inverse residual modification function is disallowed; determining, based on one or more characteristics of the block, whether application of the second inverse residual modification function is disallowed.

Example 1B

A method of encoding video data, the method comprising: applying a first residual modification function to first chroma residual data to generate first modified chroma residual data; encoding the first modified chroma residual data; applying a second residual modification function to second chroma residual data to generate second modified chroma residual data; and encoding the second modified chroma residual data, wherein the first chroma residual data is associated with a first chroma component and the second chroma residual data is associated with a second chroma component.

Example 2B

The method of example 1B, wherein encoding the modified chroma residual data comprises: applying a forward transform to the modified chroma residual data to generate transform data; and quantizing the transform data to generate quantized transform data.

Example 3B

The method of any of examples 1B-2B, wherein: the first residual modification function is: F1(x,y)=(resCb(x,y)−resCr(x,y)+A1)/N1, the second residual modification function is: F2(x,y)=(resCb(x,y)+resCr(x,y)+A2)/N2, where resCb(x, y) is the first chroma residual data, resCr(x,y) is the second chroma residual data, A1 and A2 are rounding terms, and 1/N1 and 1/N2 are normalizing factors.

Example 4B

The method of any of examples 1B-2B, wherein: the first residual modification function is: F1(x,y)=(resCb(x,y)+resCr(x,y)+A1)/N1, the second residual modification function is: F2(x,y)=(resCb(x,y)−resCr(x,y)+A2)/N2, where resCb(x, y)' is the first chroma residual data, resCr(x,y) is the second chroma residual data, A1 and A2 are rounding terms, and 1/N1 and 1/N2 are normalizing factors.

Example 5B

The method of any of examples 1B-2B, wherein: the first residual modification function is: F1(x,y)=(resCb(x,y)+A10)/N10−(resCr(x,y)+A11)/N11, the second residual modification function is: F2(x,y)=(resCb(x,y)+A20)/N20+(resCr(x,y)+A21)/N21, where resCb(x,y)' is the first chroma residual data, resCr(x,y) is the second chroma residual data, A10, A11, A20, and A21 are rounding terms, and 1/N10, 1/N11, 1/N20, and 1/N21 are normalizing factors.

Example 6B

The method of any of examples 1B-5B, wherein: the method further comprises: applying chroma residual scaling (CRS) to the first chroma residual data; and applying CRS to the second chroma residual data, applying the first residual modification function comprises applying the first residual modification function to the first chroma residual data after applying CRS to the first chroma residual data, and applying the second residual modification function comprises applying the second residual modification function to the second chroma residual data after applying CRS to the second chroma residual data.

Example 7B

The method of any of examples 1B-6B, wherein: applying the first residual modification function comprises applying a forward transform process to the first chroma residual data and before quantizing the first chroma residual data, and applying the second residual modification function comprises applying the forward transform process to the second chroma residual data and before quantizing the second chroma residual data.

Example 8B

The method of any of examples 3B-5B, wherein resCr(x, y) or resCb(x,y) is substituted with resY(x,y)', where resY(x,y)' is luma residual data.

Example 9B

The method of any of examples 1B-8B, further comprising signaling, in a bitstream that includes an encoded representation of the video data, a flag indicating whether to apply the first residual modification function and the second residual modification function.

Example 10B

The method of example 9B, wherein the flag is signaled if a coded block flag (CBF) for the first chroma component is true and a CBF for the second chroma component is true.

Example 11B

The method of example 10B, wherein the flag is a first flag and the method further comprises including, in the bitstream, a second flag, the second flag being for a transform unit, the second flag indicating which of the following applies: (i) both the first chroma residual data and the second chroma residual data are signaled, and (ii) only one of the first chroma residual data and the second chroma residual data is signaled.

Example 12B

The method of example 11B, the method further comprising including, in the bitstream, a third flag indicating which of the first chroma residual data and the second chroma residual data is forced to zero.

Example 13B

The method of any of examples 9B-12B, wherein the flag indicating whether to apply the first residual modification function and the second residual modification function is a first flag and the method further comprises: including, in the bitstream, a CBF for the first chroma component; selecting, based on the CBF for the first chroma component, a context for the first flag; and entropy encoding the first flag using the selected context.

Example 14B

The method of any of examples 9B-12B, wherein the flag indicating whether to apply the first residual modification function and the second residual modification function is a first flag and the method further comprises: selecting, based on the first flag, a context for a CBF for the first chroma component; and entropy encoding the CBF for the first chroma component using the selected context.

Example 15B

The method of any of examples 1B-14B, further comprising: determining the first residual modification function from among a plurality of available first residual modification functions; and determining the second residual modification function from among a plurality of available second residual modification functions.

Example 16B

The method of any of examples 1B-15B, further comprising: after applying the first residual modification function to the first chroma residual data: applying a transform to the first chroma residual data to generate first chroma transform data; and quantizing the first chroma transform data based on a quantization parameter and a first quantization parameter offset; and after applying the second residual modification function to the second chroma residual data: applying the transform to the second chroma residual data to generate second chroma transform data; and quantizing the first chroma transform data based on the quantization parameter and a second quantization parameter offset.

Example 17B

The method of example 16B, further comprising: signaling, in a bitstream that comprises an encoded representation of the video data, at least one of the first quantization parameter offset or the second quantization parameter offset.

Example 18B

The method of any of examples 1B-17B, further comprising: determining, based on one or more characteristics of a block, whether application of the first residual modification function is disallowed; determining, based on one or more characteristics of the block, whether application of the second residual modification function is disallowed.

Example 1C

A device for coding video data, the device comprising one or more means for performing the method of any of examples 1A-18A or 1B-18B.

Example 2C

The device of example 1C, wherein the one or more means comprise one or more processors implemented in circuitry.

Example 3C

The device of any of examples 1C-2C, further comprising a memory to store the video data.

Example 4C

The device of any of examples 1C-3C, further comprising a display configured to display decoded video data.

Example 5C

The device of any of examples 1C-4C, wherein the device comprises one or more of a camera, a computer, a mobile device, a broadcast receiver device, or a set-top box.

Example 6C

The device of any of examples 1C-5C, wherein the device comprises a video decoder.

Example 7C

The device of any of examples 1C-6C, wherein the device comprises a video encoder.

Example 8C

A computer-readable storage medium having stored thereon instructions that, when executed, cause one or more processors to perform the method of any of examples 1A-18A or 1B-18B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
generating decoded modified chroma residual data by applying an inverse transform to convert a set of transform coefficients of a block of the video data from a transform domain to a sample domain;

after generating the decoded modified chroma residual data, applying a first inverse residual modification function to the decoded modified chroma residual data to generate first inverse modified chroma residual data for a first chroma component, wherein the first inverse residual modification function sets the first inverse modified chroma residual data equal to the decoded modified chroma residual data;

after generating the decoded modified chroma residual data, applying a second inverse residual modification function to the decoded modified chroma residual data to generate second inverse modified chroma residual data for a second chroma component, wherein the second inverse residual modification function sets the second inverse modified chroma residual data equal to a value divided by 2, where the value is equal to 0 minus the decoded modified chroma residual data; and reconstructing the block of the video data based on the first inverse modified chroma residual data and the second inverse modified chroma residual data.

2. The method of claim 1, wherein reconstructing the block comprises:

adding the first inverse modified chroma residual data to first predicted chroma data to obtain first reconstructed chroma data of the block; and adding the second inverse modified chroma residual data to second predicted chroma data to obtain second reconstructed chroma data of the block.

3. The method of claim 1, wherein the method further comprises:

determining whether to apply the first inverse residual modification function or a third inverse residual modification function to the decoded modified chroma residual data to generate the first inverse modified chroma residual data; and determining whether to apply the second inverse residual modification function or a fourth inverse residual modification function to the decoded modified chroma residual data to generate the second inverse modified chroma residual data.

4. The method of claim 3, wherein:

determining whether to apply the first inverse residual modification function or the third inverse residual modification function comprises determining, based on one or more characteristics of the block, whether to apply the first inverse residual modification function or the third inverse residual modification function to the decoded modified chroma residual data to generate the first inverse modified chroma residual data; and determining whether to apply the second inverse residual modification function or the fourth inverse residual modification function comprises determining, based on the one or more characteristics of the block, whether to apply the second inverse residual modification function or the fourth inverse residual modification function to the decoded modified chroma residual data to generate the second inverse modified chroma residual data.

5. The method of claim 4, wherein the characteristics of the block include one or more of: whether a slice or tile that contains the block is an intra type or an inter type, whether current picture referencing is used with the block, whether a dual or shared coding tree is used with the block, dimensions of the block, or an aspect ratio of the block.

6. The method of claim 3, wherein:

determining whether to apply the first inverse residual modification function or the third inverse residual modification function comprises determining, based on data signaled in a bitstream, whether to apply the first inverse residual modification function or the third inverse residual modification function to the decoded modified chroma residual data to generate the first inverse modified chroma residual data; and determining whether to apply the second inverse residual modification function or the fourth inverse residual modification function comprises determining, based on the data signaled in the bitstream, whether to apply the second inverse residual modification function or the fourth inverse residual modification function to the decoded modified chroma residual data to generate the second inverse modified chroma residual data.

7. A device for decoding video data, the device comprising:

a memory to store the video data; and one or more processors implemented in circuitry, the one or more processors configured to:

generate decoded modified chroma residual data by applying an inverse transform to convert a set of transform coefficients of a block of the video data from a transform domain to a sample domain;

after generating the decoded modified chroma residual data, apply a first inverse residual modification function to the decoded modified chroma residual data to generate first inverse modified chroma residual data for a first chroma component, wherein the first inverse residual modification function sets the first inverse modified chroma residual data equal to the decoded modified chroma residual data;

after generating the decoded modified chroma residual data, apply a second inverse residual modification function to the decoded modified chroma residual data to generate second inverse modified chroma residual data for a second chroma component, wherein the second inverse residual modification function sets the second inverse modified chroma residual data equal to a value divided by 2, where the value is equal to 0 minus the decoded modified chroma residual data; and reconstruct the block of the video data based on the first inverse modified chroma residual data and the second inverse modified chroma residual data.

8. The device of claim 7, wherein the one or more processors are configured such that, as part of reconstructing the block, the one or more processors:

add the first inverse modified chroma residual data to first predicted chroma data to obtain first reconstructed chroma data of the block; and add the second inverse modified chroma residual data to second predicted chroma data to obtain second reconstructed chroma data of the block.

9. The device of claim 7, wherein the one or more processors are further configured to:

determine whether to apply the first inverse residual modification function or a third inverse residual modification function to the decoded modified chroma residual data to generate the first inverse modified chroma residual data; and determine whether to apply the second inverse residual modification function or a fourth inverse residual modification function to the decoded modified chroma residual data to generate the second inverse modified chroma residual data.

10. The device of claim 9, wherein:
the one or more processors are configured such that, as part of determining whether to apply the first inverse residual modification function or the third inverse residual modification function, the one or more processors determine, based on one or more characteristics of the block, whether to apply the first inverse residual modification function or the third inverse residual modification function to the decoded modified chroma residual data to generate the first inverse modified chroma residual data; and
the one or more processors are configured such that, as part of determining whether to apply the second inverse residual modification function or the fourth inverse residual modification function, the one or more processors determine, based on the one or more characteristics of the block, whether to apply the second inverse residual modification function or the fourth inverse residual modification function to the decoded modified chroma residual data to generate the second inverse modified chroma residual data.

11. The device of claim 10, wherein the characteristics of the block include one or more of: whether a slice or tile that contains the block is an intra type or an inter type, whether current picture referencing is used with the block, whether a dual or shared coding tree is used with the block, dimensions of the block, or an aspect ratio of the block.

12. The device of claim 9, wherein:
the one or more processors are configured such that, as part of determining whether to apply the first inverse residual modification function or the third inverse residual modification function, the one or more processors determine, based on data signaled in a bitstream, whether to apply the first inverse residual modification function or the third inverse residual modification function to the decoded modified chroma residual data to generate the first inverse modified chroma residual data; and
the one or more processors are configured such that, as part of determining whether to apply the second inverse residual modification function or the fourth inverse residual modification function, the one or more processors determine, based on the data signaled in the bitstream, whether to apply the second inverse residual modification function or the fourth inverse residual modification function to the decoded modified chroma residual data to generate the second inverse modified chroma residual data.

13. The device of claim 7, further comprising a display configured to display decoded video data.

14. The device of claim 7, wherein the device comprises one or more of a camera, a computer, a mobile device, a broadcast receiver device, or a set-top box.

15. A device for decoding video data, the device comprising:
means for generating decoded modified chroma residual data by applying an inverse transform to convert a set of transform coefficients of a block of the video data from a transform domain to a sample domain;
means for applying, after generating the decoded modified chroma residual data, a first inverse residual modification function to the decoded modified chroma residual data to generate first inverse modified chroma residual data for a first chroma component, wherein the first inverse residual modification function sets the first inverse modified chroma residual data equal to the decoded modified chroma residual data;
means for applying, after generating the decoded modified chroma residual data, a second inverse residual modification function to the decoded modified chroma residual data to generate second inverse modified chroma residual data for a second chroma component, wherein the second inverse residual modification function sets the second inverse modified chroma residual data equal to a value divided by 2, where the value is equal to 0 minus the decoded modified chroma residual data; and
means for reconstructing the block of the video data based on the first inverse modified chroma residual data and the second inverse modified chroma residual data.

16. A non-transitory computer-readable storage medium having stored thereon instructions that, when executed, cause one or more processors to:
generate decoded modified chroma residual data by applying an inverse transform to convert a set of transform coefficients of a block of video data from a transform domain to a sample domain;
after generating the decoded modified chroma residual data, apply a first inverse residual modification function to the decoded modified chroma residual data to generate first inverse modified chroma residual data for a first chroma component, wherein the first inverse residual modification function sets the first inverse modified chroma residual data equal to the decoded modified chroma residual data;
after generating the decoded modified chroma residual data, apply a second inverse residual modification function to the decoded modified chroma residual data to generate second inverse modified chroma residual data for a second chroma component, wherein the second inverse residual modification function sets the second inverse modified chroma residual data equal to a value divided by 2, where the value is equal to 0 minus the decoded modified chroma residual data; and
reconstruct the block of the video data based on the first inverse modified chroma residual data and the second inverse modified chroma residual data.

* * * * *